United States Patent
Kalra et al.

(10) Patent No.: US 11,302,012 B2
(45) Date of Patent: Apr. 12, 2022

(54) SYSTEMS AND METHODS FOR TRANSPARENT OBJECT SEGMENTATION USING POLARIZATION CUES

(71) Applicant: BOSTON POLARIMETRICS, INC., Palo Alto, CA (US)

(72) Inventors: Agastya Kalra, Nepean (CA); Vage Taamazyan, Moscow (RU); Supreeth Krishna Rao, San Jose, CA (US); Kartik Venkataraman, San Jose, CA (US); Ramesh Raskar, Cambridge, MA (US); Achuta Kadambi, Los Altos Hills, CA (US)

(73) Assignee: BOSTON POLARIMETRICS, INC., Palo Alto, CA (US)

(*) Notice: Subject to any disclaimer, the term of this patent is extended or adjusted under 35 U.S.C. 154(b) by 0 days.

(21) Appl. No.: 17/266,046

(22) PCT Filed: Aug. 28, 2020

(86) PCT No.: PCT/US2020/048604
§ 371 (c)(1),
(2) Date: Feb. 4, 2021

(87) PCT Pub. No.: WO2021/108002
PCT Pub. Date: Jun. 3, 2021

(65) Prior Publication Data
US 2021/0264607 A1 Aug. 26, 2021

Related U.S. Application Data

(60) Provisional application No. 62/942,113, filed on Nov. 30, 2019, provisional application No. 63/001,445, filed on Mar. 29, 2020.

(51) Int. Cl.
*G06T 7/11* (2017.01)
*B25J 9/16* (2006.01)
(Continued)

(52) U.S. Cl.
CPC .............. *G06T 7/11* (2017.01); *B25J 9/1697* (2013.01); *G05B 13/027* (2013.01); *G06K 9/629* (2013.01);
(Continued)

(58) Field of Classification Search
CPC ............ G06T 7/11; G06T 2207/20081; G06T 2207/20084; G06T 2207/10024;
(Continued)

(56) References Cited

U.S. PATENT DOCUMENTS

| | | |
|---|---|---|
| 4,124,798 A | 11/1978 | Thompson |
| 4,198,646 A | 4/1980 | Alexander et al. |

(Continued)

FOREIGN PATENT DOCUMENTS

| | | |
|---|---|---|
| CN | 2488005 Y | 4/2002 |
| CN | 1619358 A | 5/2005 |

(Continued)

OTHER PUBLICATIONS

US 8,957,977 B2, 02/2015, Venkataraman et al. (withdrawn)
(Continued)

*Primary Examiner* — Xuemei G Chen
(74) *Attorney, Agent, or Firm* — Lewis Roca Rothgerber Christie LLP

(57) ABSTRACT

A computer-implemented method for computing a prediction on images of a scene includes: receiving one or more polarization raw frames of a scene, the polarization raw frames being captured with a polarizing filter at a different linear polarization angle; extracting one or more first tensors in one or more polarization representation spaces from the polarization raw frames; and computing a prediction regarding one or more optically challenging objects in the scene based on the one or more first tensors in the one or more polarization representation spaces.

28 Claims, 18 Drawing Sheets

(51) Int. Cl.
  *G05B 13/02* (2006.01)
  *G06K 9/62* (2022.01)
  *G06N 3/04* (2006.01)
  *G06V 10/40* (2022.01)
  *G06V 10/56* (2022.01)

(52) U.S. Cl.
  CPC ......... *G06K 9/6256* (2013.01); *G06N 3/0454* (2013.01); *G06V 10/40* (2022.01); *G06V 10/56* (2022.01); *G06T 2207/10024* (2013.01); *G06T 2207/20081* (2013.01); *G06T 2207/20084* (2013.01)

(58) Field of Classification Search
  CPC ........ G06T 7/174; G06N 3/0454; G06K 9/46; G06K 9/4652; G06K 9/629; G06K 9/6256; B25J 9/1697; G05B 13/027; G06V 10/40; G06V 10/56; G06V 10/147; G06V 10/454; G06V 10/60; G06V 10/82
  See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,867,584 A * | 2/1999 | Hu .......................... G06K 9/32 382/103 |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |

(56) References Cited

U.S. PATENT DOCUMENTS

| | | |
|---|---|---|
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,350,957 B2 | 1/2013 | Schechner et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,471,895 B2 | 6/2013 | Banks |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |

(56) References Cited

U.S. PATENT DOCUMENTS

| | | |
|---|---|---|
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,659,751 B1 | 5/2020 | Briggs et al. |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,976,239 B1 * | 4/2021 | Hart ................ G01H 9/00 |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |

(56) References Cited

U.S. PATENT DOCUMENTS

| | | |
|---|---|---|
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036135 A1 | 2/2005 | Earthman et al. |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215879 A1* | 9/2006 | Whitaker ............... G06T 7/11 |
| | | 382/103 |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |

(56) References Cited

U.S. PATENT DOCUMENTS

| | | |
|---|---|---|
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0237662 A1* | 9/2009 | Chang ................. G01J 4/04 356/364 |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0295933 A1* | 12/2009 | Schechner ............ G06T 5/007 348/222.1 |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |

(56) References Cited

U.S. PATENT DOCUMENTS

| | | |
|---|---|---|
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0296724 A1 | 11/2010 | Chang et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329528 A1 | 12/2010 | Hajnal et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |

(56) References Cited

U.S. PATENT DOCUMENTS

| | | |
|---|---|---|
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0123985 A1* | 5/2013 | Hirai ............... B25J 9/1697 700/259 |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |

(56) References Cited

U.S. PATENT DOCUMENTS

| | | |
|---|---|---|
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0303463 A1* | 10/2014 | Robinson ............... G01J 3/0262 600/316 |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0093015 A1 | 4/2015 | Liang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0206912 A1* | 7/2015 | Kanamori ......... H01L 27/14643 250/208.1 |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0256733 A1* | 9/2015 | Kanamori ............. G02F 1/0136 348/234 |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0070030 A1 | 3/2016 | Fujisawa et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0216198 A1* | 7/2016 | Sun ..................... G01N 21/538 |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0261844 A1 | 9/2016 | Kadambi et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |

(56) References Cited

U.S. PATENT DOCUMENTS

| | | | |
|---|---|---|---|
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0178399 A1* | 6/2017 | Fest ............................ G06T 7/70 |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0268990 A1* | 9/2017 | Martinello ............. G01N 21/21 |
| 2017/0337682 A1* | 11/2017 | Liao ........................... G06T 7/30 |
| 2017/0365104 A1 | 12/2017 | McMahon et al. |
| 2018/0005012 A1* | 1/2018 | Aycock ................ G06K 9/0063 |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0100731 A1 | 4/2018 | Pau |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0177461 A1* | 6/2018 | Bell ....................... A61B 5/0095 |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0052792 A1* | 2/2019 | Baba ..................... H04N 13/327 |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0174077 A1 | 6/2019 | Mitani et al. |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2019/0392189 A1* | 12/2019 | Kumar ................. G06K 9/6288 |
| 2020/0012119 A1* | 1/2020 | Pezzaniti ............. G02B 27/285 |
| 2020/0026948 A1 | 1/2020 | Venkataraman et al. |
| 2020/0034998 A1* | 1/2020 | Schlemper ........... G06K 9/4628 |
| 2020/0151894 A1 | 5/2020 | Jain et al. |
| 2020/0162680 A1* | 5/2020 | Mitani ................... G03B 11/00 |
| 2020/0195862 A1* | 6/2020 | Briggs ............... H04N 5/23229 |
| 2020/0204729 A1* | 6/2020 | Kurita ................... G01N 21/27 |
| 2020/0252597 A1 | 8/2020 | Mullis |
| 2020/0311418 A1* | 10/2020 | Mahadeswaraswamy ................. G06K 9/22 |
| 2020/0334905 A1 | 10/2020 | Venkataraman |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0081698 A1 | 3/2021 | Lindeman et al. |
| 2021/0084206 A1* | 3/2021 | McEldowney ...... H04N 5/2258 |
| 2021/0089807 A1* | 3/2021 | Liu ........................ G06K 9/627 |
| 2021/0133927 A1 | 5/2021 | Lelescu et al. |
| 2021/0150748 A1 | 5/2021 | Ciurea et al. |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |

(56) References Cited

FOREIGN PATENT DOCUMENTS

| | | |
|---|---|---|
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 1020050004239 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | 1535292 B | 5/2016 |
| WO | 1994020875 A3 | 9/1994 |
| WO | 2005057922 A1 | 6/2005 |
| WO | 2006039906 A2 | 4/2006 |

(56) References Cited

FOREIGN PATENT DOCUMENTS

| | | |
|---|---|---|
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |
| WO | 2019038193 A1 | 2/2019 |

OTHER PUBLICATIONS

Atkinson et al. "High-sensitivity analysis of polarization by surface reflection" In: Machine Vision and Applications, Aug. 3, 2018, Retrieved on Oct. 26, 2020 from https://link.springer.com/content/pdf/10.1007/s00138-018-0962-7.pdf, 19 pages.

Sajjan, "Learning to See Transparent Objects," In: Google, Feb. 12, 2020, Retrieved on Oct. 26, 2020 from https://ai.ggogleblog.com/2020/02/learning-to-see-transparent.objects.html, 6 pages.

Arnab et al. "Pixelwise instance segmentation with a dynamically instantiated network," In: Proceedings of the IEEE Conference on Computer Vision and Pattern Recognition, Apr. 7, 2017, Retrieved on Oct. 26, 2020 from https://openaccess.thecvf.com/content_cvpr_2017/papers/Arnab_Pixelwise_Instance_Seqmentation_CFPR_2017_paper.pdf, 11 pages.

Bai et al. "Deep watershed transform for instance segmentation," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Bai_Deep_Watershed_Transform_CVPR_2017_paper.pdf, 10 pages.

Kirillov et al., "Instancecut: from edges to instances with multicut," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Kiriliov_InstanceCut_From_Edges_CVPR_2017_paper.pdf, 11 pages.

Miyazaki et al. Transparent surface modeling from a pair of polarization images. *IEEE Transactions on Pattern Analysis & Machine Intelligenc*, vol. 26, (1):73-82, Jan. 2004.

He et al. Mask r-cnn. In *Proceedings of the IEEE International Conference on Computer Vision*, pp. 2961-2969, 2017.

Romera-Paredes et al. Recurrent instance segmentation. In *European Conference on Computer Vision*, pp. 312-329. Springer, 2016.

Ren et al. End-to-end instance segmentation with recurrent attention. In *Proceedings of the IEEE Conference on Computer Vision and Pattern Recognition*, pp. 6656-6664, 2017.

Written Opinion for International Application No. PCT/US2020/048604, dated Nov. 13, 2020, 8 pages.

Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.

Aufderheide et al., "A MEMS-based Smart Sensor System for Estimation of Camera Pose for Computer Vision Applications", Research and Innovation Conference 2011, Jul. 29, 2011, pp. 1-10.

Baker et al., "Limits on Super-Resolution and How to Break Them", IEEE Transactions on Pattern Analysis and Machine Intelligence, Sep. 2002, vol. 24, No. 9, pp. 1167-1183.

Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.

Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.

Bennett et al., "Multispectral Bilateral Video Fusion", Computer Graphics (ACM SIGGRAPH Proceedings), Jul. 25, 2006, published Jul. 30, 2006, 1 pg.

Bennett et al., "Multispectral Video Fusion", Computer Graphics (ACM SIGGRAPH Proceedings), Jul. 25, 2006, published Jul. 30, 2006, 1 pg.

Berretti et al., "Face Recognition by Super-Resolved 3D Models from Consumer Depth Cameras", IEEE Transactions on Information Forensics and Security, vol. 9, No. 9, Sep. 2014, pp. 1436-1448.

Bertalmio et al., "Image Inpainting", Proceedings of the 27th Annual Conference on Computer Graphics and Interactive Techniques, 2000, ACM Pres/Addison-Wesley Publishing Co., pp. 417-424.

Bertero et al., "Super-resolution in computational imaging", Micron, Jan. 1, 2003, vol. 34, Issues 6-7, 17 pgs.

(56) References Cited

OTHER PUBLICATIONS

Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for the Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences - A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames - An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc, of SPIE - IS&T Electronic Imaging, Feb. 3, 2009, vol. 7246, p. 72460X-1 -72460X-9; doi: 10.1117/12.810369.
Bruckner et al., "Thin wafer-level camera lenses inspired by insect compound eyes", Optics Express, Nov. 22, 2010, vol. 18, No. 24, p. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pgs.
Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Caron et al., "Multiple camera types simultaneous stereo calibration, Robotics and Automation (ICRA)", 2011 IEEE International Conference on, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.

Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation for 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010.939075, Retrieved from http://minhdo.ece.illinois.edu/publications/ImmerComm_SPM.pdf, pp. 58-66.
Dou et al., "End-to-end 3D face reconstruction with deep neural networks", arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, August 2013, vol. 22, No. 8, pp. 3260-3270, first published May 14, 2013.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.

(56) References Cited

OTHER PUBLICATIONS

Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11 Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation Geometry to the Rescue", In European Conference on Computer Vision, Springer, Cham, Jul. 2016, 16 pgs.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/

(56) References Cited

OTHER PUBLICATIONS web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computerand Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger et al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", ICCV IEEE 11th International Conference on Computer Vision; Publication [online], Oct. 2007 [retrieved Jul. 28, 2014], Retrieved from the Internet <URL: http:l/ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", ICCV IEEE 11th International Conference on Computer Vision; Publication [online], Oct. 2007 [retrieved Jul. 28, 2014], Retrieved from the Internet: <URL: http:l/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. 1-103-1-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV'13 Proceedings of the 2013 IEEE International Conference on Computer Vision, IEEE Computer Society, Washington DC, USA, Dec. 1-8, 2013, 8 pgs.

(56) References Cited

OTHER PUBLICATIONS

Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR Feb. 2005, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html-11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 • Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.

(56) References Cited

OTHER PUBLICATIONS

Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014], Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29 -Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.

(56) References Cited

OTHER PUBLICATIONS

Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from http://www.exif.org/Exif2-2.PDF, 154 pgs.
Azorin-Lopez, Jorge, et al. "A Novel Active Imaging Model to Design Visual Systems: A Case of Inspection System for Specular Surfaces." Sensors 17.7 (2017): 1466, 30 pages.
Bajard, Alban, et al. "Non conventional Imaging Systems for 3D Digitization of transparent and/or specular manufactured objects." QCAV2013, 11th Interntional Conference on Quality Control by Artificial Vision. 2013, 9 pages.
Barnes, Bryan M., et al. "Enhancing 9 nm Node Dense Patterned Defect Optical Inspection using Polarization, Angle, and Focus." Metrology, Inspection, and Process Control for Microlithography XXVII. vol. 8681. International Society for Optics and Photonics, 2013, 8 pages.
Brugés Martelo, Javier, et al. "Paperboard Coating Detection Based on Full-Stokes Imaging Polarimetry." Sensors 21.1 (2021): 208, 14 pages.
Chen, Hua, et al. "Polarization Phase-Based Method for Material Classification in Computer Vision," International Journal of Computer Vision 28(1), 1996, pp. 73-83.
Cui, Zhaopeng, et al. "Polarimetric multi-view stereo," *Proceedings of the IEEE conference on computer vision and pattern recognition*. 2017, pp. 1558-1567.
Kadambi, Achuta et al., "Polarized 3d: High-quality depth sensing with polarization cues," *Proceedings of the IEEE International Conference on Computer Vision*. 2015, pp. 3370-3378.
Meriaudeau, Fabrice, et al. "Polarization imaging for industrial inspection." Image Processing: Machine Vision Applications. vol. 6813. International Society for Optics and Photonics, 2008, 11 pages.
Miyazaki, Daisuke, et al. "Surface normal estimation of black specular objects from multiview polarization images." Optical Engineering 56.4 (2016): 041303, 18 pages.
Miyazaki, Daisuke, et al. "Polarization-based surface normal estimation of black specular objects from multiple viewpoints." 2012 Second International Conference on 3D Imaging, Modeling, Processing, Visualization & Transmission. IEEE, 2012, 8 pages.
Morel, Olivier, et al. "Three-Dimensional Inspection of Highly-Reflective Metallic Objects by Polarization Imaging." Electronic Imaging Newsletter 15.2 (2005): 4.
Morel, Olivier, et al. "Visual Behaviour Based Bio-Inspired Polarization Techniques in Computer Vision and Robotics." Developing and Applying Biologically-Inspired Vision Systems: Interdisciplinary Concepts. IGI Global, 2013. 243-272.
Morel, O., et al. "Polarization Imaging for 3D Inspection of Highly Reflective Metallic Objects" Optics and Spectroscopy, vol. 101, No. 1, pp. 11-17, (2006).
Rahmann, Stefan. "Polarization images: a geometric interpretation for shape analysis." Proceedings 15th International Conference on Pattern Recognition. ICPR-2000. vol. 3. IEEE, 2000, 5 pages.
Stolz, Christophe, et al. "Short review of polarimetric imaging based method for 3D measurements" Optics, Photonics and Digital Technologies for Imaging Applications IV. vol. 9896. International Society for Optics and Photonics, 2016, 9 pages.
Stolz, Christophe, et al. "Real time polarization imaging of weld pool surface." Twelfth International Conference on Quality Control by Artificial Vision 2015. vol. 9534. International Society for Optics and Photonics, 2015, 7 pages.
Xu, L. M., et al. "Light source optimization for automatic visual inspection of piston surface defects" The International Journal of Advanced Manufacturing Technology 91.5 (2017): 2245-2256.
Yvain Quéau, Jean-Denis Durou, Jean-François Aujol. Normal Integration: A Survey. 2016. Hal-01334349v4, 19 pages.
International Search Report and Written Opinion for International Application No. PCT/US20/54641, dated Feb. 17, 2021, 13 pages.
Written Opinion for International Application No. PCT/US2020/051243, dated Dec. 9, 2020, 9 pages.

* cited by examiner

SYSTEMS AND METHODS FOR TRANSPARENT OBJECT SEGMENTATION USING POLARIZATION CUES

CROSS-REFERENCE TO RELATED APPLICATION(S)

This application is a U.S. National Phase Patent Application of International Application Number PCT/US2020/048604, filed on Aug. 28, 2020, which claims priority to and the benefit of U.S. Provisional Patent Application No. 62/942,113, filed in the United States Patent and Trademark Office on Nov. 30, 2019 and which claims priority to and the benefit of U.S. Provisional Patent Application No. 63/001,445, filed in the United States Patent and Trademark Office on Mar. 29, 2020, the entire disclosure of each of which is incorporated by reference herein.

FIELD

Aspects of embodiments of the present disclosure relate to the field of computer vision and the segmentation of images into distinct objects depicted in the images.

BACKGROUND

Semantic segmentation refers to a computer vision process of capturing one or more two-dimensional (2-D) images of a scene and algorithmically classifying various regions of the image (e.g., each pixel of the image) as belonging to particular of classes of objects. For example, applying semantic segmentation to an image of people in a garden may assign classes to individual pixels of the input image, where the classes may include types of real-world objects such as: person; animal; tree; ground; sky; rocks; buildings; and the like. Instance segmentation refers to further applying unique labels to each of the different instances of objects, such as by separately labeling each person and each animal in the input image with a different identifier.

One possible output of a semantic segmentation or instance segmentation process is a segmentation map or segmentation mask, which may be a 2-D image having the same dimensions as the input image, and where the value of each pixel corresponds to a label (e.g., a particular class in the case of semantic segmentation or a particular instance in the case of instance segmentation).

Segmentation of images of transparent objects is a difficult, open problem in computer vision. Transparent objects lack texture (e.g., surface color information, such as in "texture mapping" as the term is used in the field of computer graphics), adopting instead the texture or appearance of the scene behind those transparent objects (e.g., the background of the scene visible through the transparent objects). As a result, in some circumstances, transparent objects (and other optically challenging objects) in a captured scene are substantially invisible to the semantic segmentation algorithm, or may be classified based on the objects that are visible through those transparent objects.

SUMMARY

Aspects of embodiments of the present disclosure relate to transparent object segmentation of images by using light polarization (the rotation of light waves) to provide additional channels of information to the semantic segmentation or other machine vision process. Aspects of embodiments of the present disclosure also relate to detection and/or segmentation of other optically challenging objects in images by using light polarization, where optically challenging objects may exhibit one or more conditions including being: non-Lambertian; translucent; multipath inducing; or non-reflective. In some embodiments, a polarization camera is used to capture polarization raw frames to generate multi-modal imagery (e.g., multi-dimensional polarization information). Some aspects of embodiments of the present disclosure relate to neural network architecture using a deep learning backbone for processing the multi-modal polarization input data. Accordingly, embodiments of the present disclosure reliably perform instance segmentation on cluttered, transparent and otherwise optically challenging objects in various scene and background conditions, thereby demonstrating an improvement over comparative approaches based on intensity images alone.

According to one embodiment of the present disclosure a computer-implemented method for computing a prediction on images of a scene includes: receiving one or more polarization raw frames of a scene, the polarization raw frames being captured with a polarizing filter at a different linear polarization angle; extracting one or more first tensors in one or more polarization representation spaces from the polarization raw frames; and computing a prediction regarding one or more optically challenging objects in the scene based on the one or more first tensors in the one or more polarization representation spaces.

The one or more first tensors in the one or more polarization representation spaces may include: a degree of linear polarization (DOLP) image in a DOLP representation space; and an angle of linear polarization (AOLP) image in an AOLP representation space.

The one or more first tensors may further include one or more non-polarization tensors in one or more non-polarization representation spaces, and the one or more non-polarization tensors may include one or more intensity images in intensity representation space.

The one or more intensity images may include: a first color intensity image; a second color intensity image; and a third color intensity image.

The prediction may include a segmentation mask.

The computing the prediction may include supplying the one or more first tensors to one or more corresponding convolutional neural network (CNN) backbones, and each of the one or more CNN backbones may be configured to compute a plurality of mode tensors at a plurality of different scales.

The computing the prediction may further include: fusing the mode tensors computed at a same scale by the one or more CNN backbones.

The fusing the mode tensors at the same scale may include concatenating the mode tensors at the same scale; supplying the mode tensors to an attention subnetwork to compute one or more attention maps; and weighting the mode tensors based on the one or more attention maps to compute a fused tensor for the scale.

The computing the prediction may further include supplying the fused tensors computed at each scale to a prediction module configured to compute the segmentation mask.

The segmentation mask may be supplied to a controller of a robot picking arm.

The prediction may include a classification of the one or more polarization raw frames based on the one or more optically challenging objects.

The prediction may include one or more detected features of the one or more optically challenging objects depicted in the one or more polarization raw frames.

The computing the prediction may include supplying the one or more first tensors in the one or more polarization representation spaces to a statistical model, and the statistical model may be trained using training data including training first tensors in the one or more polarization representation spaces and labels.

The training data may include: source training first tensors, in the one or more polarization representation spaces, computed from data captured by a polarization camera; and additional training first tensors generated from the source training first tensors through affine transformations including a rotation.

When the additional training first tensors include an angle of linear polarization (AOLP) image, generating the additional training first tensors may include: rotating the additional training first tensors by an angle; and counter-rotating pixel values of the AOLP image by the angle.

According to one embodiment of the present disclosure, a computer vision system includes: a polarization camera including a polarizing filter; and a processing system including a processor and memory storing instructions that, when executed by the processor, cause the processor to: receive one or more polarization raw frames of a scene, the polarization raw frames being captured with a polarizing filter at a different linear polarization angle; extract one or more first tensors in one or more polarization representation spaces from the polarization raw frames; and compute a prediction regarding one or more optically challenging objects in the scene based on the one or more first tensors in the one or more polarization representation spaces.

The one or more first tensors in the one or more polarization representation spaces may include: a degree of linear polarization (DOLP) image in a DOLP representation space; and an angle of linear polarization (AOLP) image in an AOLP representation space.

The one or more first tensors may further include one or more non-polarization tensors in one or more non-polarization representation spaces, and wherein the one or more non-polarization tensors include one or more intensity images in intensity representation space.

The one or more intensity images may include: a first color intensity image; a second color intensity image; and a third color intensity image.

The prediction may include a segmentation mask.

The memory may further store instructions that, when executed by the processor, cause the processor to compute the prediction by supplying the one or more first tensors to one or more corresponding convolutional neural network (CNN) backbones, wherein each of the one or more CNN backbones is configured to compute a plurality of mode tensors at a plurality of different scales.

The memory may further store instructions that, when executed by the processor, cause the processor to: fuse the mode tensors computed at a same scale by the one or more CNN backbones.

The instructions that cause the processor to fuse the mode tensors at the same scale may include instructions that, when executed by the processor, cause the processor to: concatenate the mode tensors at the same scale; supply the mode tensors to an attention subnetwork to compute one or more attention maps; and weight the mode tensors based on the one or more attention maps to compute a fused tensor for the scale.

The instructions that cause the processor to compute the prediction may further include instructions that, when executed by the processor, cause the processor to supply the fused tensors computed at each scale to a prediction module configured to compute the segmentation mask.

The segmentation mask may be supplied to a controller of a robot picking arm.

The prediction may include a classification of the one or more polarization raw frames based on the one or more optically challenging objects.

The prediction may include one or more detected features of the one or more optically challenging objects depicted in the one or more polarization raw frames.

The instructions to compute the prediction may include instructions that, when executed by the processor, cause the processor to supply the one or more first tensors to a statistical model, and the statistical model may be trained using training data including training first tensors in the one or more polarization representation spaces and labels.

The training data may include: source training first tensors computed from data captured by a polarization camera; and additional training first tensors generated from the source training first tensors through affine transformations including a rotation.

When the additional training first tensors include an angle of linear polarization (AOLP) image, generating the additional training first tensors includes: rotating the additional training first tensors by an angle; and counter-rotating pixel values of the AOLP image by the angle.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
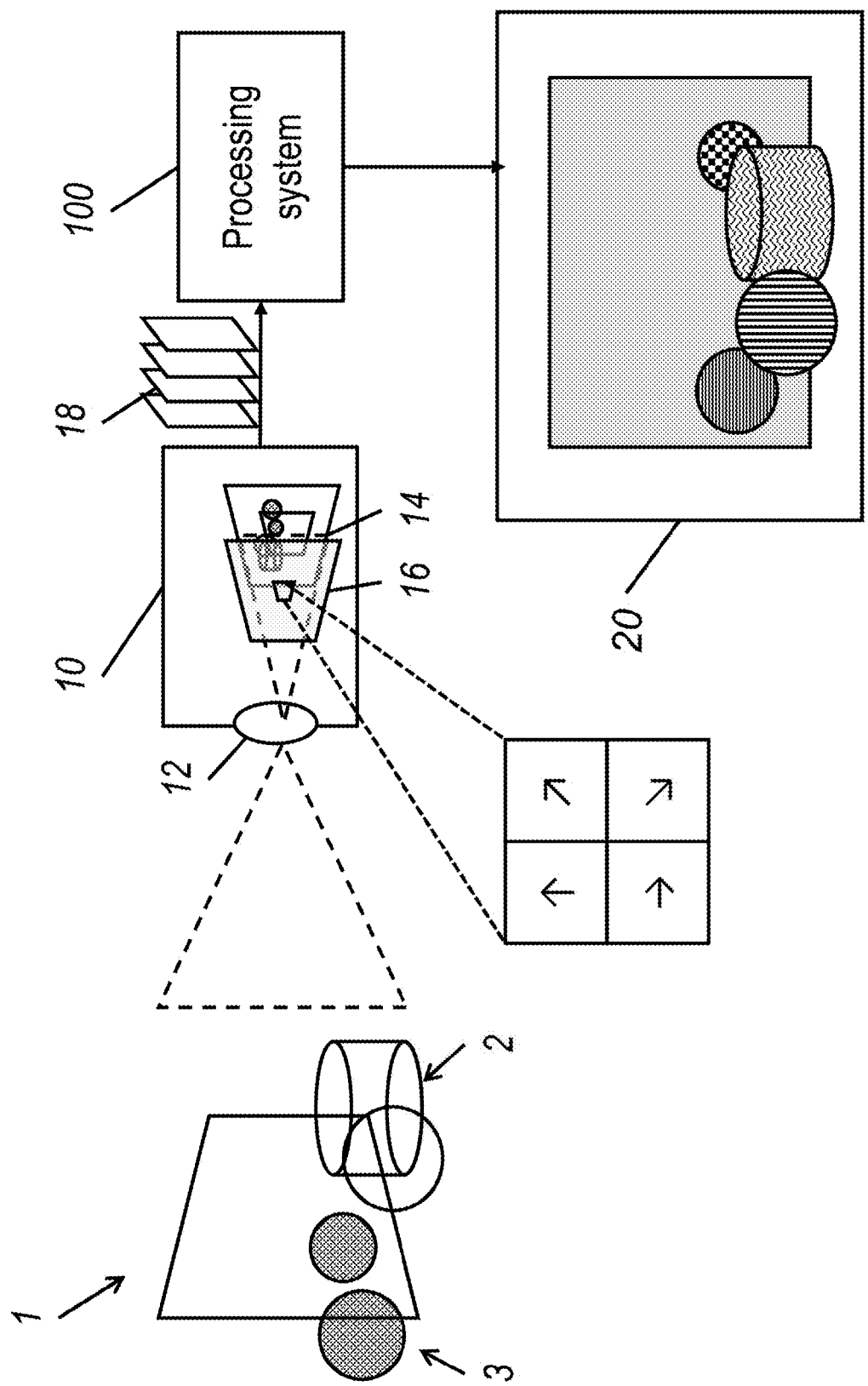
FIG. 1 is a schematic block diagram of a system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Transparent objects occur in many real-world applications of computer vision or machine vision systems, including automation and analysis for manufacturing, life sciences, and automotive industries. For example, in manufacturing, computer vision systems may be used to automate: sorting, selection, and placement of parts; verification of placement of components during manufacturing; and final inspection and defect detection. As additional examples, in life sciences, computer vision systems may be used to automate: measurement of reagents; preparation of samples; reading outputs of instruments; characterization of samples; and picking and placing container samples. Further examples in automotive industries include detecting transparent objects in street scenes for assisting drivers or for operating self-driving vehicles. Additional examples may include assistive technologies, such as self-navigating wheelchairs capable of detecting glass doors and other transparent barriers and devices for assisting people with vision impairment that are capable of detecting transparent drinking glasses and to distinguish between real objects and print-out spoofs.

In contrast to opaque objects, transparent objects lack texture of their own (e.g., surface color information, as the term is used in the field of computer graphics, such as in "texture mapping"). As a result, comparative systems generally fail to correctly identify instances of transparent objects that are present in scenes captured using standard imaging systems (e.g., cameras configured to capture monochrome intensity images or color intensity images such as red, green, and blue or RGB images). This may be because the transparent objects do not have a consistent texture (e.g., surface color) for the algorithms to latch on to or to learn to detect (e.g., during the training process of a machine learning algorithm). Similar issues may arise from partially transparent or translucent objects, as well as some types of reflective objects (e.g., shiny metal) and very dark objects (e.g., matte black objects).

Accordingly, aspects of embodiments of the present disclosure relate to using polarization imaging to provide information for segmentation algorithms to detect transparent objects in scenes. In addition, aspects of embodiments of the present disclosure also apply to detecting other optically challenging objects such as transparent, translucent, and reflective objects as well as dark objects.

As used herein, the term "optically challenging" refers to objects made of materials that satisfy one or more of the following four characteristics at a sufficient threshold level or degree: non-Lambertian (e.g., not matte); translucent; multipath inducing; and/or non-reflective. In some circumstances an object exhibiting only one of the four characteristics may be optically challenging to detect. In addition, objects or materials may exhibit multiple characteristics simultaneously. For example, a translucent object may have a surface reflection and background reflection, so it is challenging both because of translucency and the multipath. In some circumstances, an object may exhibit one or more of the four characteristics listed above, yet may not be optically challenging to detect because these conditions are not exhibited at a level or degree that would pose a problem to a comparative computer vision systems. For example, an object may be translucent, but still exhibit enough surface texture to be detectable and segmented from other instances of objects in a scene. As another example, a surface must be sufficiently non-Lambertian to introduce problems to other vision systems. In some embodiments, the degree or level to which an object is optically challenging is quantified using the full-width half max (FWHM) of the specular lobe of the bidirectional reflectance distribution function (BRDF) of the object. If this FWHM is below a threshold, the material is considered optically challenging.

FIG. 1 is a schematic block diagram of a system according to one embodiment of the present invention. In the arrangement shown in FIG. 1, a scene 1 includes transparent objects 2 (e.g., depicted as a ball such as a glass marble, a cylinder such as a drinking glass or tumbler, and a plane such as a pane of transparent acrylic) that are placed in front of opaque matte objects 3 (e.g., a baseball and a tennis ball). A polarization camera 10 has a lens 12 with a field of view, where the lens 12 and the camera 10 are oriented such that the field of view encompasses the scene 1. The lens 12 is configured to direct light (e.g., focus light) from the scene 1 onto a light sensitive medium such as an image sensor 14 (e.g., a complementary metal oxide semiconductor (CMOS) image sensor or charge-coupled device (CCD) image sensor).

The polarization camera 10 further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1 depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 1 is capable of concurrently or simultaneously capturing light at four different linear polarizations. One example of a polarization camera is the Blackfly® S Polarization Camera produced by FLIR® Systems, Inc. of Wilsonville, Oreg.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than or more than four different polarizations, or may have polarizations at different angles (e.g., at angles of polarization of: 0°, 60° degrees, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14.

As a result, the polarization camera captures multiple input images 18 (or polarization raw frames) of the scene 1, where each of the polarization raw frames 18 corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

In some embodiments of the present disclosure, such as some of the embodiments described above, the different polarization raw frames are captured by a same polarization camera 10 and therefore may be captured from substantially the same pose (e.g., position and orientation) with respect to the scene 1. However, embodiments of the present disclosure are not limited thereto. For example, a polarization camera 10 may move with respect to the scene 1 between different polarization raw frames (e.g., when different raw polarization raw frames corresponding to different angles of polarization are captured at different times, such as in the case of a mechanically rotating polarizing filter), either because the polarization camera 10 has moved or because objects in the scene 1 have moved (e.g., if the objects are located on a moving conveyor belt). Accordingly, in some embodiments of the present disclosure different polarization raw frames are captured with the polarization camera 10 at different poses with respect to the scene 1.

The polarization raw frames 18 are supplied to a processing circuit 100, described in more detail below, computes a segmentation map 20 based of the polarization raw frames 18. As shown in FIG. 1, in the segmentation map 20, the transparent objects 2 and the opaque objects 3 of the scene are all individually labeled, where the labels are depicted in FIG. 1 using different colors or patterns (e.g., vertical lines, horizontal lines, checker patterns, etc.), but where, in practice, each label may be represented by a different value (e.g., an integer value, where the different patterns shown in the figures correspond to different values) in the segmentation map.

According to various embodiments of the present disclosure, the processing circuit 100 is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a segmentation map 20 from input polarization raw frames 18. The operations performed by the processing circuit 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing circuit 100 may be referred to herein as a computer or a computer system, which may include memory storing instructions that, when executed by the one or more electronic circuits, implement the systems and methods described herein.

Figure 2B:
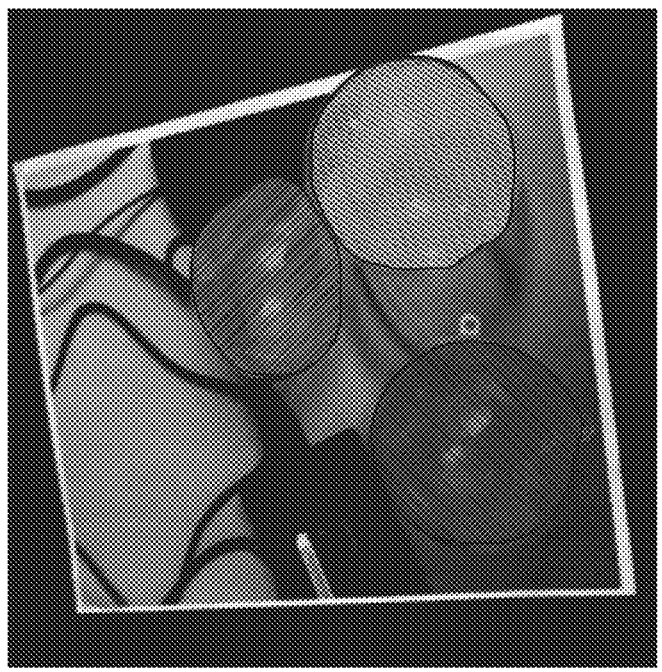
FIG. 2B depicts the intensity image of FIG. 2A with an overlaid segmentation mask as computed by a comparative Mask Region-based Convolutional Neural Network (Mask R-CNN) identifying instances of transparent balls, where the real transparent ball is correctly identified as an instance, and the two spoofs are incorrectly identified as instances.
Figure 2A:
FIG. 2A is an image or intensity image of a scene with one real transparent ball placed on top of a printout of photograph depicting another scene containing two transparent balls ("spoofs") and some background clutter.

FIGS. 2A, 2B, 2C, and 2D provide background for illustrating the segmentation maps computed by a comparative approach and semantic segmentation or instance segmentation according to embodiments of the present disclosure. In more detail, FIG. 2A is an image or intensity image of a scene with one real transparent ball placed on top of a printout of photograph depicting another scene containing two transparent balls ("spoofs") and some background clutter. FIG. 2B depicts an segmentation mask as computed by a comparative Mask Region-based Convolutional Neural Network (Mask R-CNN) identifying instances of transparent balls overlaid on the intensity image of FIG. 2A using different patterns of lines, where the real transparent ball is correctly identified as an instance, and the two spoofs are incorrectly identified as instances. In other words, the Mask R-CNN algorithm has been fooled into labeling the two spoof transparent balls as instances of actual transparent balls in the scene.

Figure 2D:
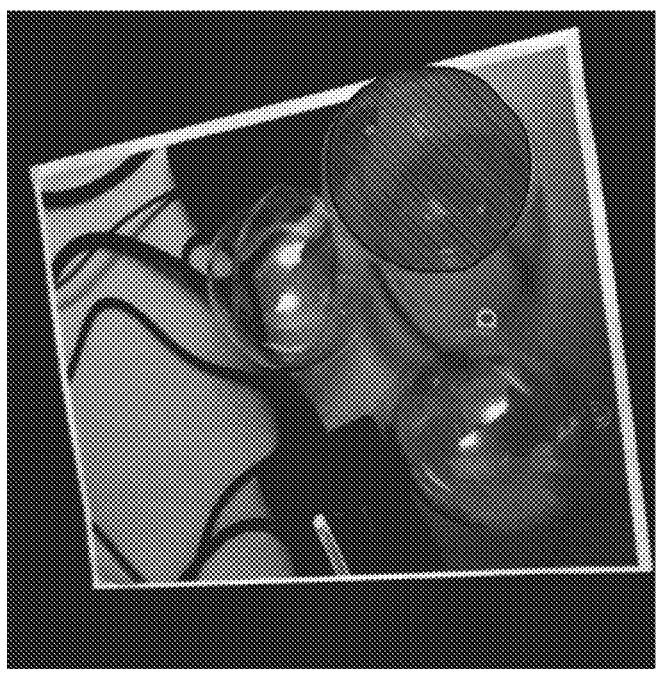
FIG. 2D depicts the intensity image of FIG. 2A with an overlaid segmentation mask as computed using polarization data in accordance with an embodiment of the present invention, where the real transparent ball is correctly identified as an instance and the two spoofs are correctly excluded as instances.
Figure 2C:
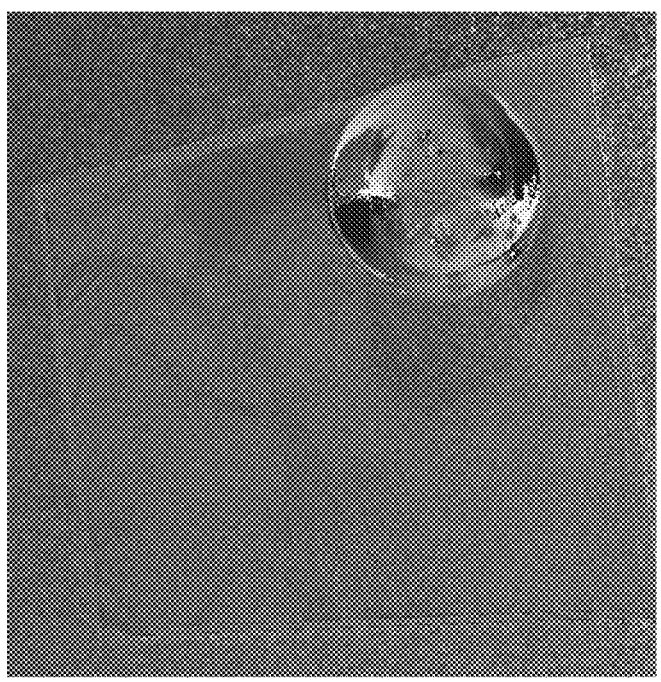
FIG. 2C is an angle of polarization image computed from polarization raw frames captured of the scene according to one embodiment of the present invention.

FIG. 2C is an angle of linear polarization (AOLP) image computed from polarization raw frames captured of the scene according to one embodiment of the present invention. As shown in FIG. 2C, transparent objects have a very unique texture in polarization space such as the AOLP domain, where there is a geometry-dependent signature on edges and a distinct or unique or particular pattern that arises on the surfaces of transparent objects in the angle of linear polarization. In other words, the intrinsic texture of the transparent object (e.g., as opposed to extrinsic texture adopted from the background surfaces visible through the transparent object) is more visible in the angle of polarization image of FIG. 2C than it is in the intensity image of FIG. 2A.

FIG. 2D depicts the intensity image of FIG. 2A with an overlaid segmentation mask as computed using polarization data in accordance with an embodiment of the present invention, where the real transparent ball is correctly identified as an instance using an overlaid pattern of lines and the two spoofs are correctly excluded as instances (e.g., in contrast to FIG. 2B, FIG. 2D does not include overlaid patterns of lines over the two spoofs). While FIGS. 2A, 2B, 2C, and 2D illustrate an example relating to detecting a real transparent object in the presence of spoof transparent objects, embodiments of the present disclosure are not limited thereto and may also be applied to other optically challenging objects, such as transparent, translucent, and non-matte or non-Lambertian objects, as well as non-reflective (e.g., matte black objects) and multipath inducing objects.

Accordingly, some aspects of embodiments of the present disclosure relate to extracting, from the polarization raw frames, tensors in representation space (or first tensors in first representation spaces, such as polarization feature maps) to be supplied as input to semantic segmentation algorithms or other computer vision algorithms. These first tensors in first representation space may include polarization feature maps that encode information relating to the polarization of light received from the scene such as the AOLP image shown in FIG. 2C, degree of linear polarization (DOLP) feature maps, and the like (e.g., other combinations from Stokes vectors or transformations of individual ones of the polarization raw frames). In some embodiments, these polarization feature maps are used together with non-polarization feature maps (e.g., intensity images such as the image shown in FIG. 2A) to provide additional channels of information for use by semantic segmentation algorithms.

While embodiments of the present invention are not limited to use with particular semantic segmentation algorithms, some aspects of embodiments of the present invention relate to deep learning frameworks for polarization-based segmentation of transparent or other optically challenging objects (e.g., transparent, translucent, non-Lambertian, multipath inducing objects, and non-reflective (e.g., very dark) objects), where these frameworks may be referred to as Polarized Convolutional Neural Networks (Polarized CNNs). This Polarized CNN framework includes a backbone that is suitable for processing the particular texture of polarization and can be coupled with other computer vision architectures such as Mask R-CNN (e.g., to form a Polarized Mask R-CNN architecture) to produce a solution for accurate and robust instance segmentation of transparent objects. Furthermore, this approach may be applied to scenes with a mix of transparent and non-transparent (e.g., opaque objects) and can be used to identify instances of transparent, translucent, non-Lambertian, multipath inducing, dark, and opaque objects in the scene.

Figure 3:
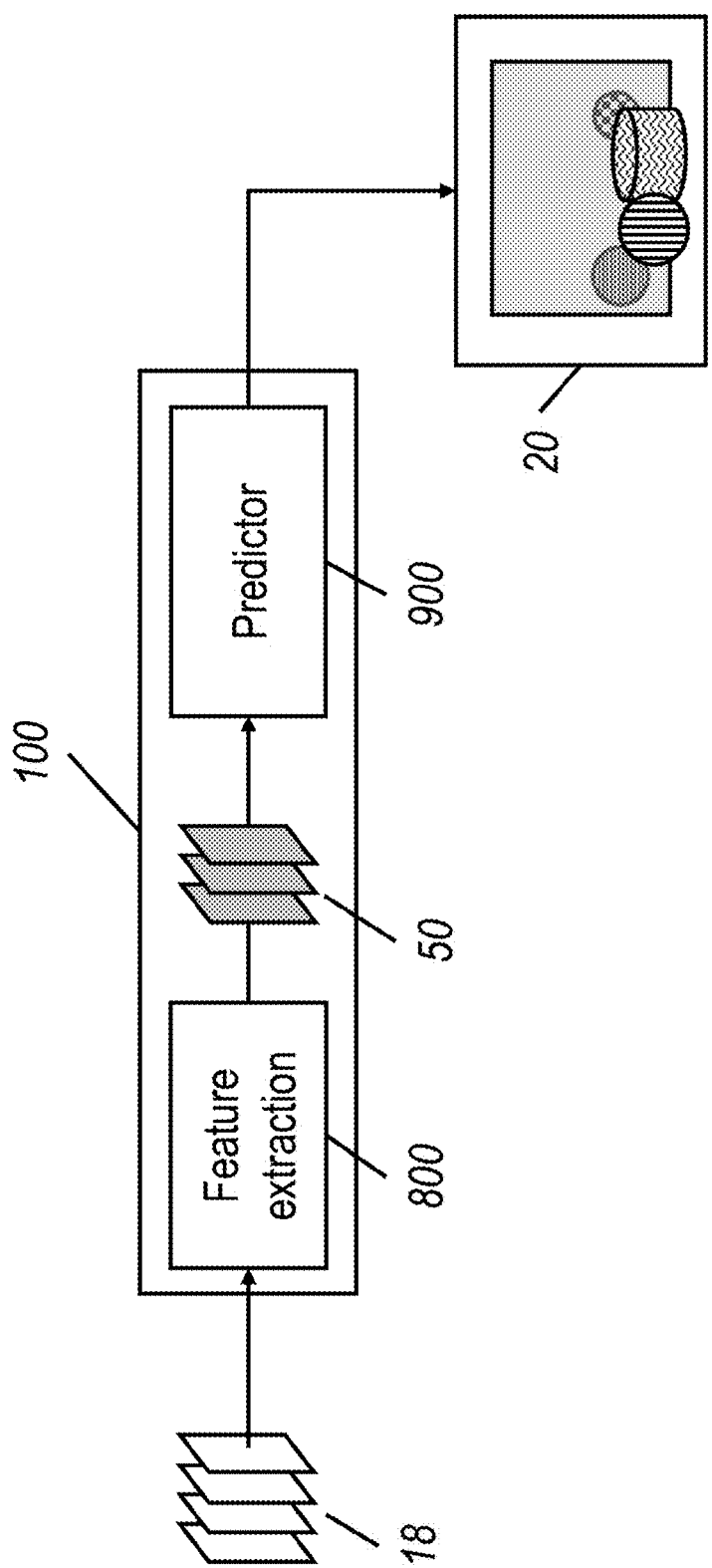
FIG. 3 is a block diagram of processing circuit for computing segmentation maps based on polarization data according to one embodiment of the present invention.
Figure 4:
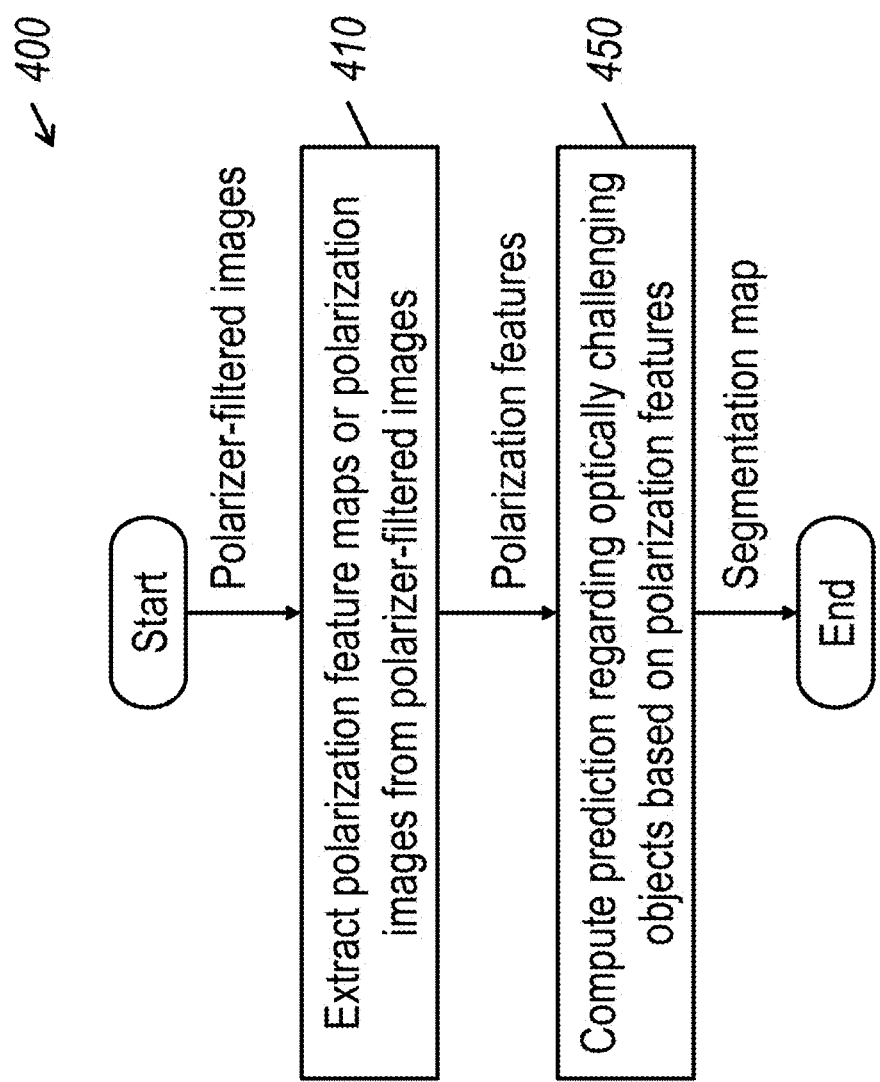
FIG. 4 is a flowchart of a method for performing segmentation on input images to compute a segmentation map according to one embodiment of the present invention.

FIG. 3 is a block diagram of processing circuit 100 for computing segmentation maps based on polarization data according to one embodiment of the present invention. FIG. 4 is a flowchart of a method for performing segmentation on input images to compute a segmentation map according to one embodiment of the present invention. As shown in FIG. 3, in some embodiments, a processing circuit 100 includes a feature extractor or feature extraction system 800 and a predictor 900 (e.g., a classical computer vision prediction algorithm or a trained statistical model) configured to compute a prediction output 20 (e.g., a statistical prediction) regarding one or more transparent objects in the scene based on the output of the feature extraction system 800. While some embodiments of the present disclosure are described herein in the context of training a system for detecting transparent objects, embodiments of the present disclosure are not limited thereto, and may also be applied to techniques for other optically challenging objects or objects made of materials that are optically challenging to detect such as translucent objects, multipath inducing objects, objects that are not entirely or substantially matte or Lambertian, and/or very dark objects. These optically challenging objects include objects that are difficult to resolve or detect through the use of images that are capture by camera systems that are not sensitive to the polarization of light (e.g., based on images captured by cameras without a polarizing filter in the optical path or where different images do not capture images based on different polarization angles).

In the embodiment shown in FIGS. 3 and 4, in operation 410, the feature extraction system 800 of the processing system 100 extracts one or more first feature maps 50 in one or more first representation spaces (including polarization images or polarization feature maps in various polarization representation spaces) from the input polarization raw frames 18 of a scene. The extracted derived feature maps 50 (including polarization images) are provided as input to the predictor 900 of the processing system 100, which implements one or more prediction models to compute, in operation 450, a detected output 20. In the case where the predictor is an image segmentation or instance segmentation system, the prediction may be a segmentation map such as that shown in FIG. 3, where each pixel may be associated with one or more confidences that the pixel corresponds to various possible classes (or types) of objects. In the case where the predictor is a classification system, the prediction may include a plurality of classes and corresponding confidences that the image depicts an instance of each of the classes. In the case where the predictor 900 is a classical computer vision prediction algorithm, the predictor may compute a detection result (e.g., detect edges, keypoints, basis coefficients, Haar wavelet coefficients, or other features of transparent objects and/or other optically challenging objects, such as translucent objects, multipath inducing objects, non-Lambertian objects, and non-reflective objects in the image as output features).

In the embodiment shown in FIG. 3, the predictor 900 implements an instance segmentation (or a semantic segmentation) system and computes, in operation 450, an output 20 that includes a segmentation map for the scene based on the extracted first tensors 50 in first representation spaces, extracted from the input polarization raw frames 18. As noted above the feature extraction system 800 and the predictor 900 are implemented using one or more electronic circuits that are configured to perform their operations, as described in more detail below.

Extracting First Tensors Such as Polarization Images and Derived Feature Maps in First Representation Spaces from Polarization Raw Frames Some aspects of embodiments of the present disclosure relate to systems and methods for extracting features in operation 410, where these extracted features are used in the robust detection of transparent objects in operation 450. In contrast, comparative techniques relying on intensity images alone may fail to detect transparent objects (e.g., comparing the intensity image of FIG. 2A with the AOLP image of FIG. 2C, discussed above). The term "first tensors" in "first representation spaces" will be used herein to refer to features computed from (e.g., extracted from) polarization raw frames 18 captured by a polarization camera, where these first representation spaces include at least polarization feature spaces (e.g., feature spaces such as AOLP and DOLP that contain information about the polarization of the light detected by the image sensor) and may also include non-polarization feature spaces (e.g., feature spaces that do not require information regarding the polarization of light reaching the image sensor, such as images computed based solely on intensity images captured without any polarizing filters).

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient in energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting instance segmentation based on intensity images alone:

Clutter: Clear edges (e.g., the edges of transparent objects) are hard to see in densely cluttered scenes with transparent objects. In extreme cases, the edges are not visible at all (see, e.g., region (b) of FIG. 6A, described in more detail below), creating ambiguities in the exact shape of the transparent objects.

Novel Environments: Low reflectivity in the visible spectrum causes transparent objects to appear different, out-of-distribution, in novel environments (e.g., environments different from the training data used to train the segmentation system, such as where the backgrounds visible through the transparent objects differ from the backgrounds in the training data), thereby leading to poor generalization.

Print-Out Spoofs: algorithms using single RGB images as input are generally susceptible to print-out spoofs (e.g., printouts of photographic images) due to the perspective ambiguity. While other non-monocular algorithms (e.g., using images captured from multiple different poses around the scene, such as a stereo camera) for semantic segmentation of transparent objects exist, they are range limited and may be unable to handle instance segmentation.

Figure 5:
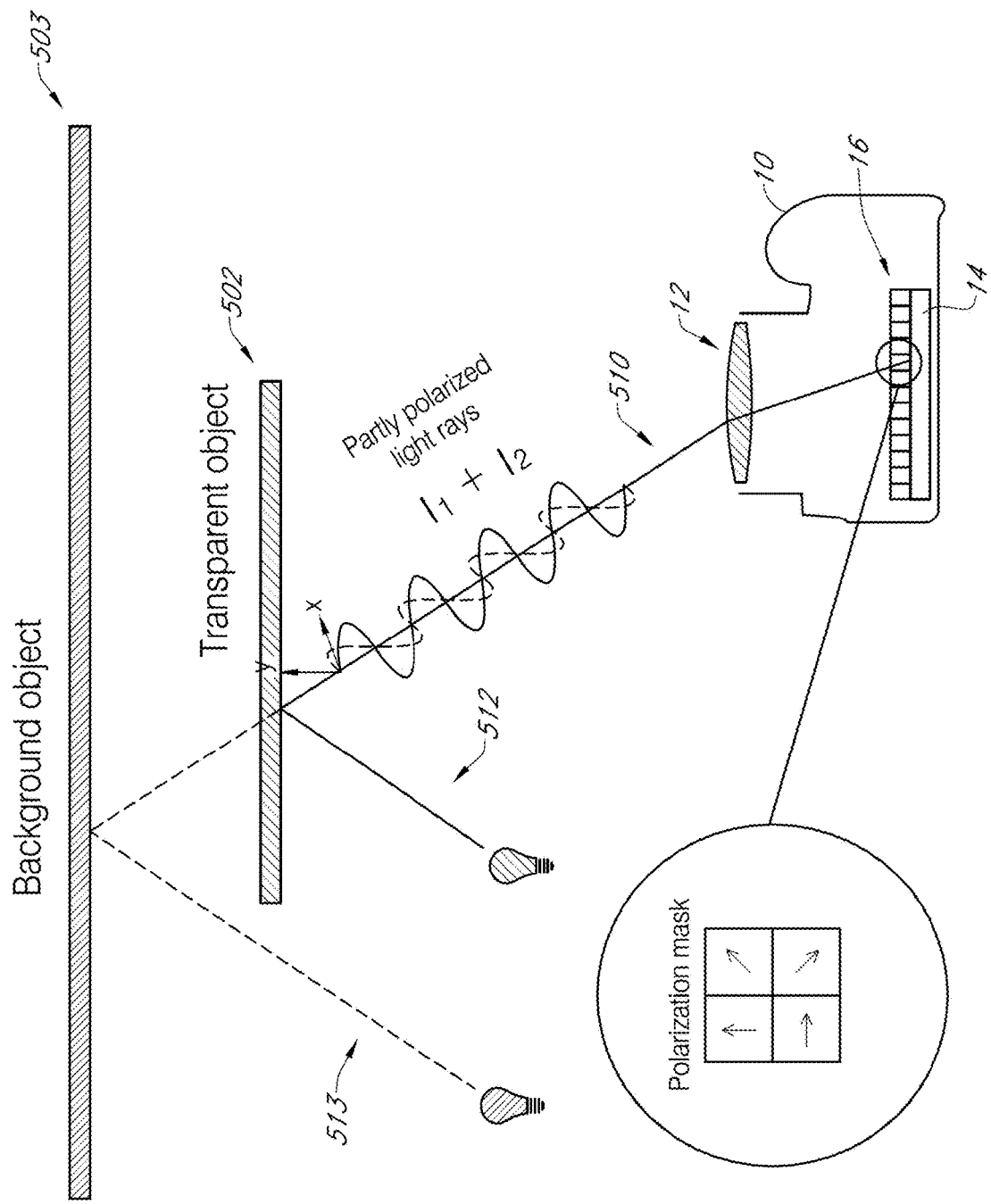
FIG. 5 is a high-level depiction of the interaction of light with transparent objects and non-transparent (e.g., diffuse and/or reflective) objects.

FIG. 5 is a high-level depiction of the interaction of light with transparent objects and non-transparent (e.g., diffuse and/or reflective) objects. As shown in FIG. 5, a polarization camera 10 captures polarization raw frames of a scene that includes a transparent object 502 in front of an opaque background object 503. A light ray 510 hitting the image sensor 14 of the polarization camera 10 contains polarization information from both the transparent object 502 and the background object 503. The small fraction of reflected light 512 from the transparent object 502 is heavily polarized, and thus has a large impact on the polarization measurement, on contrast to the light 513 reflected off the background object 503 and passing through the transparent object 502.

A light ray 510 hitting the image sensor 16 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$). These properties encode information about the surface curvature and material of the object being imaged, which can be used by the predictor 900 to detect transparent objects, as described in more detail below. In some embodiments, the predictor 900 can detect other optically challenging objects based on similar polarization properties of light passing through translucent objects and/or light interacting with multipath inducing objects or by non-reflective objects (e.g., matte black objects).

Therefore, some aspects of embodiments of the present invention relate to using a feature extractor 800 to compute first tensors in one or more first representation spaces, which may include derived feature maps based on the intensity I, the DOLP $\rho$, and the AOLP $\phi$. The feature extractor 800 may generally extract information into first representation spaces (or first feature spaces) which include polarization representation spaces (or polarization feature spaces) such as "polarization images," in other words, images that are extracted based on the polarization raw frames that would not otherwise be computable from intensity images (e.g., images captured by a camera that did not include a polarizing filter or other mechanism for detecting the polarization of light reaching its image sensor), where these polarization images may include DOLP $\rho$ images (in DOLP representation space or feature space), AOLP $\phi$ images (in AOLP representation space or feature space), other combinations of the polarization raw frames as computed from Stokes vectors, as well as other images (or more generally first tensors or first feature tensors) of information computed from polarization raw frames. The first representation spaces may include non-polarization representation spaces such as the intensity I representation space.

Measuring intensity I, DOLP ρ, and AOLP φ at each pixel requires 3 or more polarization raw frames of a scene taken behind polarizing filters (or polarizers) at different angles, $\phi_{pol}$ (e.g., because there are three unknown values to be determined: intensity I, DOLP ρ, and AOLP φ. For example, the FLIR® Blackfly® S Polarization Camera described above captures polarization raw frames with polarization angles $\phi_{pol}$ at 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$.

The relationship between $I_{\phi_{pol}}$ and intensity I, DOLP ρ, and AOLP φ at each pixel can be expressed as:

$$I_{\phi_{pol}} = I(1 + \rho \cos(2(\phi - \phi_{pol}))) \quad (1)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP ρ, and AOLP φ.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the φ and ρ components of the light ray coming from that object.

When diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2 \theta_z + 4\cos\theta_z \sqrt{n^2 - \sin^2 \theta_z}} \quad (2)$$

$$\phi = \theta_a \quad (3)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases p increases exponentially as $\theta_z$ increases and if the refractive index is the same, specular reflection is much more polarized than diffuse reflection.

Some aspects of embodiments of the present disclosure relate to supplying first tensors in the first representation spaces (e.g., derived feature maps) extracted from polarization raw frames as inputs to a predictor for computing computer vision predictions on transparent objects and/or other optically challenging objects (e.g., translucent objects, non-Lambertian objects, multipath inducing objects, and/or non-reflective objects) of the scene, such as a semantic segmentation system for computing segmentation maps including the detection of instances of transparent objects and other optically challenging objects in the scene. These first tensors may include derived feature maps which may include an intensity feature map I, a degree of linear polarization (DOLP) ρ feature map, and an angle of linear polarization (AOLP) (p feature map, and where the DOLP ρ feature map and the AOLP φ feature map are examples of polarization feature maps or tensors in polarization representation spaces, in reference to feature maps that encode information regarding the polarization of light detected by a polarization camera. Benefits of polarization feature maps (or polarization images) are illustrated in more detail with respect to FIGS. 6A, 6B, 6C, 7A, 7B, and 7C.

Figure 6C:
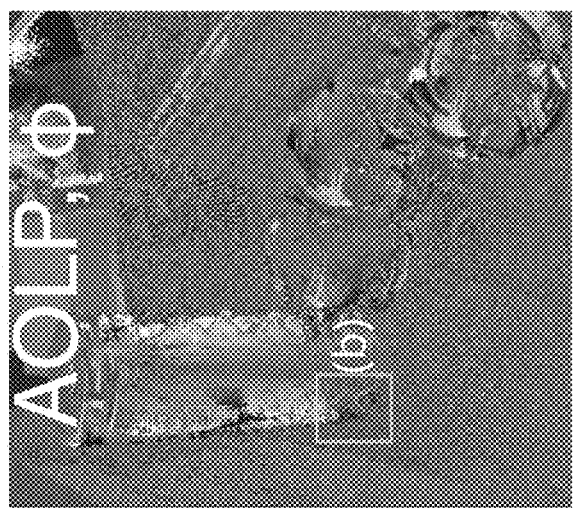
FIGS. 6A, 6B, and 6C depict example first feature maps computed by a feature extractor configured to extract derived feature maps in first representation spaces including an intensity feature map I in FIG. 6A in intensity representation space, a degree of linear polarization (DOLP) feature map p in FIG. 6B in DOLP representation space, and angle of linear polarization (AOLP) feature map p in FIG. 6C representation space, according to one embodiment of the present invention.
Figure 6B:
Figure 6A:
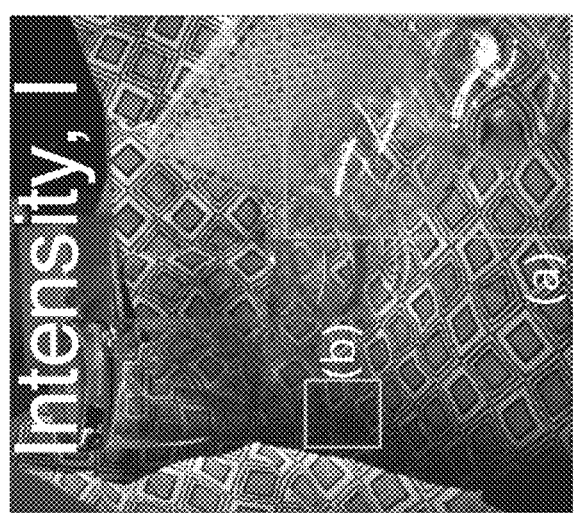

FIGS. 6A, 6B, and 6C depict example first tensors that are feature maps computed by a feature extractor configured to extract first tensors in first representation spaces including an intensity feature map I in FIG. 6A in intensity representation space, a degree of linear polarization (DOLP) feature map ρ in FIG. 6B in DOLP representation space, and angle of linear polarization (AOLP) feature map φ in FIG. 6C in AOLP representation space, according to one embodiment of the present invention. Two regions of interest—region (a) containing two transparent balls and region (b) containing the edge of a drinking glass—are discussed in more detail below.

Figure 7A:
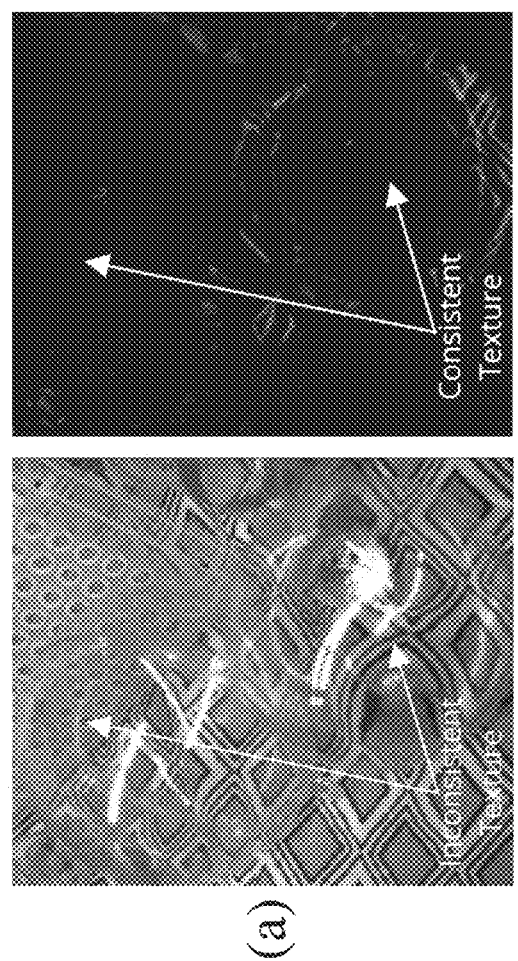
FIGS. 7A and 7B are, respectively, expanded views of the regions labeled (a) and (b) in FIGS. 6A, 6B, and 6C.
Figure 7C:
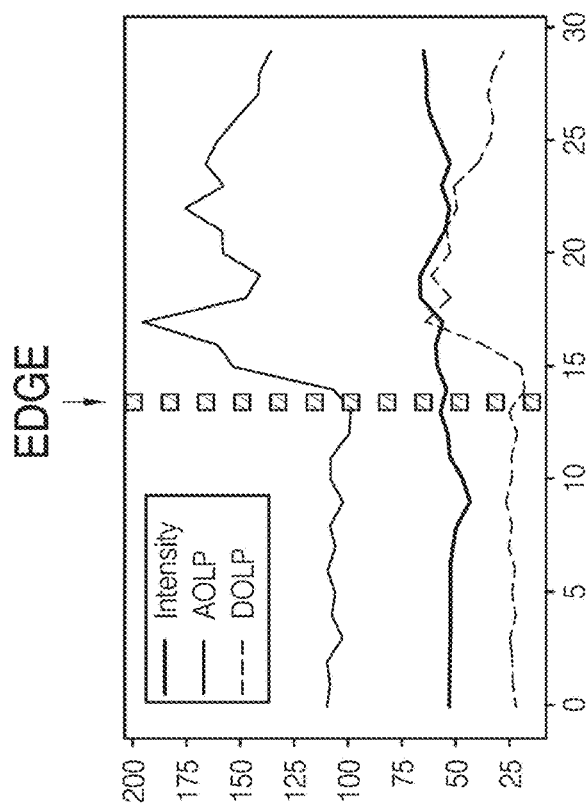
FIG. 7C is a graph depicting a cross section of an edge labeled in FIG. 7B in the intensity feature map of FIG. 6A, the DOLP feature map of FIG. 6B, and the AOLP feature map of FIG. 6C.
Figure 7B:
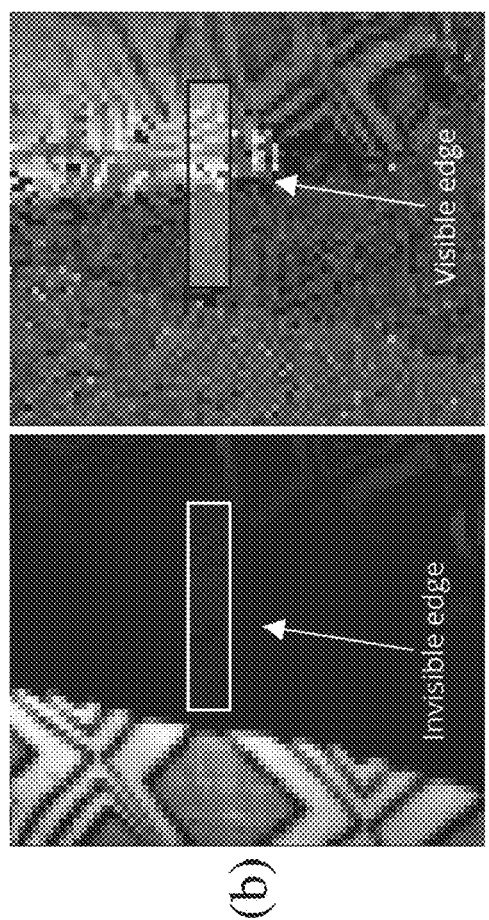

FIGS. 7A and 7B are, respectively, expanded views of the regions labeled (a) and (b) in FIGS. 6A, 6B, and 6C. FIG. 7C is a graph depicting a cross section of an edge labeled in FIG. 7B in the intensity feature map I of FIG. 6A, the DOLP feature map ρ of FIG. 6B, and the AOLP feature map φ of FIG. 6C.

Referring to region (a), as seen in FIG. 6A and the left side of FIG. 7A, the texture of the two transparent balls is inconsistent in the intensity image due to the change in background (e.g., the plastic box with a grid of holes versus the patterned cloth that the transparent balls are resting on), highlighting problems caused by novel environments (e.g., various backgrounds visible through the transparent objects). This inconsistency may make it difficult for a semantic segmentation or instance segmentation system to recognize that these very different-looking parts of the image correspond to the same type or class of object (e.g., a transparent ball).

On the other hand, in the DOLP image shown in FIG. 6B and the right side of FIG. 7A, the shape of the transparent objects is readily apparent and the background texture (e.g., the pattern of the cloth) does not appear in the DOLP image ρ. FIG. 7A is an enlarged view of region (a) of the intensity image I shown in FIG. 6A and the DOLP image p shown in FIG. 6B, showing that two different portions of the transparent balls have inconsistent (e.g., different-looking) textures in the intensity image I but have consistent (e.g., similar looking) textures in the DOLP image ρ, thereby making it more likely for a semantic segmentation or instance segmentation system to recognize that these two similar looking textures both correspond to the same class of object, based on the DOLP image ρ.

Referring region (b), as seen in FIG. 6A and the left side of FIG. 7B, the edge of the drinking glass is practically invisible in the intensity image I (e.g., indistinguishable from the patterned cloth), but is much brighter in the AOLP image φ as seen in FIG. 6C and the right side of FIG. 7B. FIG. 7C is a cross-section of the edge in the region identified boxes in the intensity image I and the AOLP image φ in FIG. 7B shows that the edge has much higher contrast in the AOLP φ and DOLP ρ than in the intensity image I, thereby making it more likely for a semantic segmentation or instance segmentation system to detect the edge of the transparent image, based on the AOLP φ and DOLP ρ images.

More formally, aspects of embodiments of the present disclosure relate to computing first tensors 50 in first representation spaces, including extracting first tensors in polarization representation spaces such as forming polarization images (or extracting derived polarization feature maps) in operation 410 based on polarization raw frames captured by a polarization camera 10.

Light rays coming from a transparent objects have two components: a reflected portion including reflected intensity $I_r$, reflected DOLP $\rho_r$, and reflected AOLP $\phi_r$ and the refracted portion including refracted intensity $I_t$, refracted DOLP $\rho_t$, and refracted AOLP $\phi_t$. The intensity of a single pixel in the resulting image can be written as:

$$I = I_r + I_t \quad (6)$$

When a polarizing filter having a linear polarization angle of $\phi_{pol}$ is placed in front of the camera, the value at a given pixel is:

$$I_{\phi_{pol}} = I_r(1 + \rho_r \cos(2(\phi_r - \phi_{pol}))) + I_t(1 + \rho_t \cos(2(\phi_t - \phi_{pol}))) \quad (7)$$

Solving the above expression for the values of a pixel in a DOLP $\rho$ image and a pixel in an AOLP $\phi$ image in terms of $I_r$, $\rho_r$, $\phi_r$, $I_t$, $\rho_t$, and $\phi_t$:

$$\rho = \frac{\sqrt{(I_r\rho_r)^2 + (I_t\rho_t)^2 + 2 I_t\rho_t I_r\rho_r \cos(2(\phi_r - \phi_t))}}{I_r + I_t} \quad (8)$$

$$\phi = \arctan\left(\frac{I_r\rho_r \sin(2(\phi_r - \phi_t))}{I_t\rho_t + I_r\rho_r \cos(2(\phi_r - \phi_t))}\right) + \phi_r \quad (9)$$

Accordingly, equations (7), (8), and (9), above provide a model for forming first tensors 50 in first representation spaces that include an intensity image I, a DOLP image $\rho$, and an AOLP image $\phi$ according to one embodiment of the present disclosure, where the use of polarization images or tensor in polarization representation spaces (including DOLP image $\rho$ and an AOLP image $\phi$ based on equations (8) and (9)) enables the reliable detection of transparent objects and other optically challenging objects that are generally not detectable by comparative systems such as a Mask R-CNN system, which uses only intensity I images as input.

In more detail, first tensors in polarization representation spaces (among the derived feature maps 50) such as the polarization images DOLP $\rho$ and AOLP $\phi$ can reveal surface texture of objects that might otherwise appear textureless in an intensity I domain. A transparent object may have a texture that is invisible in the intensity domain I because this intensity is strictly dependent on the ratio of $I_r/I_t$ (see equation (6)). Unlike opaque objects where $I_t=0$, transparent objects transmit most of the incident light and only reflect a small portion of this incident light.

On the other hand, in the domain or realm of polarization, the strength of the surface texture of a transparent object depends on $\phi_r - \phi_t$ and the ratio of $I_r\rho_r/I_t\rho_t$ (see equations (8) and (9)). Assuming that $\phi_r \neq \phi_t$ and $\theta_{zr} \neq \theta_{zt}$ for the majority of pixels (e.g., assuming that the geometries of the background and transparent object are different) and based on showings that $\rho_r$ follows the specular reflection curve (see, e.g., Daisuke Miyazaki, Masataka Kagesawa, and Katsushi Ikeuchi. Transparent surface modeling from a pair of polarization images. *IEEE Transactions on Pattern Analysis & Machine Intelligence*, (1):73-82, 2004.), meaning it is highly polarized, and at Brewster's angle (approx. 60°) $\rho_r$ is 1.0 (see equation (4)), then, at appropriate zenith angles, $\rho_r \geq \rho_t$, and, if the background is diffuse or has a low zenith angle, $\rho_r \gg \rho_t$. This effect can be seen in FIG. 2C, where the texture of the real transparent sphere dominates when $\theta_z \approx 60°$. Accordingly, in many cases, the following assumption holds:

$$\frac{I_r}{I_t} \leq \frac{I_r \rho_r}{I_t \rho_t} \quad (10)$$

Thus, even if the texture of the transparent object appears invisible in the intensity domain I, the texture of the transparent object may be more visible in the polarization domain, such as in the AOLP $\phi$ and in the DOLP $\rho$.

Returning to the three examples of circumstances that lead to difficulties when attempting semantic segmentation or instance segmentation on intensity images alone:

Clutter: One problem in clutter is in detecting the edges of a transparent object that may be substantially texture-less (see, e.g., the edge of the drinking glass in region (b) of FIG. 6A. On the other hand, the texture of the glass and its edges appear more visible in the DOLP $\rho$ shown in FIG. 6B and even more visible in the AOLP $\phi$ shown in FIG. 6C.

Novel environments: In addition to increasing the strength of the transparent object texture, the DOLP $\rho$ image shown, for example, in FIG. 6B, also reduces the impact of diffuse backgrounds like textured or patterned cloth (e.g., the background cloth is rendered almost entirely black). This allows transparent objects to appear similar in different scenes, even when the environment changes from scene-to-scene. See, e.g., region (a) in FIG. 6B and FIG. 7A.

Print-out spoofs: Paper is flat, leading to a mostly uniform AOLP $\phi$ and DOLP $\rho$. Transparent objects have some amount of surface variation, which will appear very non-uniform in AOLP $\phi$ and DOLP $\rho$ (see, e.g. FIG. 2C). As such, print-out spoofs of transparent objects can be distinguished from real transparent objects.

Figure 8A:
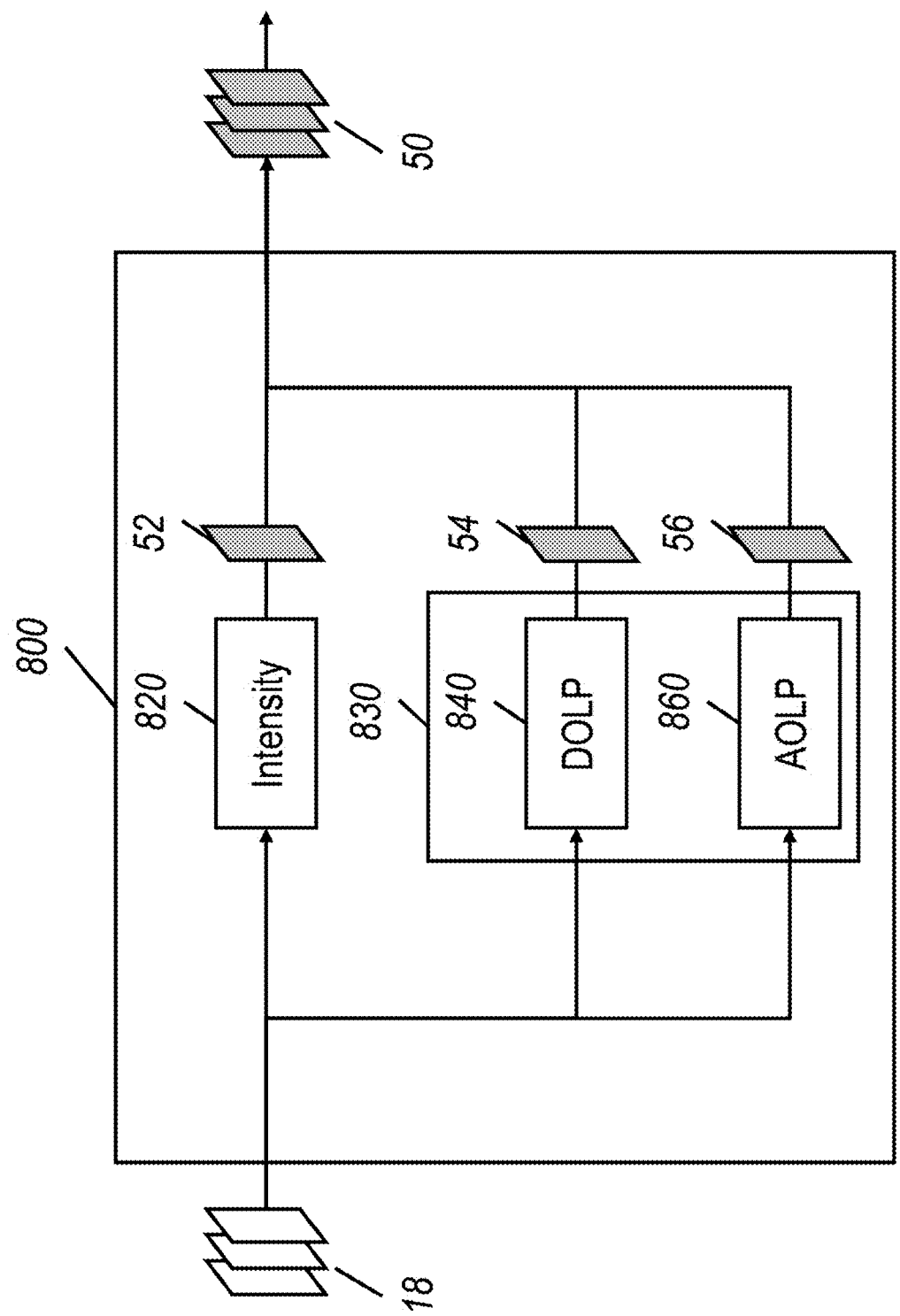
FIG. 8A is a block diagram of a feature extractor according to one embodiment of the present invention.
Figure 8B:
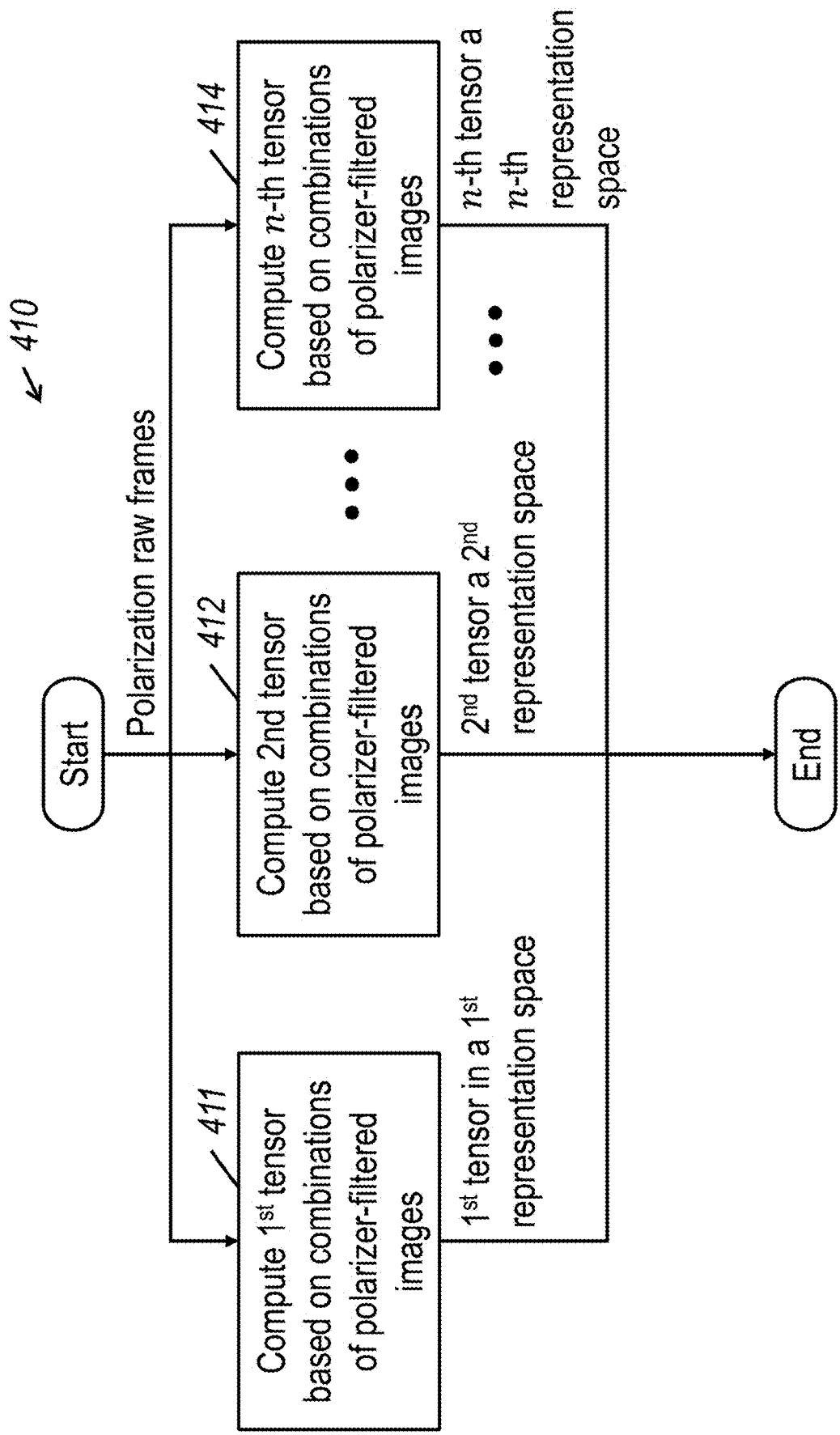
FIG. 8B is a flowchart depicting a method according to one embodiment of the present invention for extracting features from polarization raw frames.

FIG. 8A is a block diagram of a feature extractor 800 according to one embodiment of the present invention. FIG. 8B is a flowchart depicting a method according to one embodiment of the present invention for extracting features from polarization raw frames. In the embodiment shown in FIG. 8A, the feature extractor 800 includes an intensity extractor 820 configured to extract an intensity image I 52 in an intensity representation space (e.g., in accordance with equation (7), as one example of a non-polarization representation space) and polarization feature extractors 830 configured to extract features in one or more polarization representation spaces. As shown in FIG. 8B, the extraction of polarization images in operation 410 may include extracting, in operation 411, a first tensor in a first polarization representation space from the polarization raw frames from a first Stokes vector In operation 412, the feature extractor 800 further extracts a second tensor in a second polarization representation space from the polarization raw frames. For example, the polarization feature extractors 830 may include a DOLP extractor 840 configured to extract a DOLP $\rho$ image 54 (e.g., a first polarization image or a first tensor in accordance with equation (8) with DOLP as the first polarization representation space) and an AOLP extractor 860 configured to extract an AOLP $\phi$ image 56 (e.g., a second polarization image or a second tensor in accordance with equation (9), with AOLP as the second polarization representation space) from the supplied polarization raw frames 18. As another example, the polarization representation spaces may include combinations of polarization raw frames in accordance with Stokes vectors. As further examples, the polarization representations may include modifications or transformations of polarization raw frames in accordance with one or more image processing filters (e.g., a filter to increase image contrast or a denoising filter). The derived feature maps 52, 54, and 56 may then be supplied to a predictor 900 for further processing, such as performing inferences (e.g., generating instance segmentation maps, classifying the images, and generating textual descriptions of the images).

While FIG. 8B illustrates a case where two different tensors are extracted from the polarization raw frames 18 in two different representation spaces, embodiments of the present disclosure are not limited thereto. For example, in some embodiments of the present disclosure, exactly one tensor in a polarization representation space is extracted from the polarization raw frames 18. For example, one polarization representation space of raw frames is AOLP and another is DOLP (e.g., in some applications, AOLP may be sufficient for detecting transparent objects or other optically challenging objects such as translucent, non-Lambertian, multipath inducing, and/or non-reflective objects). In some embodiments of the present disclosure, more than two different tensors are extracted from the polarization raw frames 18 based on corresponding Stokes vectors. For example, as shown in FIG. 8B, n different tensors in n different representation spaces may be extracted by the feature extractor 800, where the n-th tensor is extracted in operation 414.

Accordingly, extracting features such as polarization feature maps or polarization images from polarization raw frames 18 produces first tensors 50 from which transparent objects or other optically challenging objects such as translucent objects, multipath inducing objects, non-Lambertian objects, and non-reflective objects are more easily detected or separated from other objects in a scene. In some embodiments, the first tensors extracted by the feature extractor 800 may be explicitly derived features (e.g., hand crafted by a human designer) that relate to underlying physical phenomena that may be exhibited in the polarization raw frames (e.g., the calculation of AOLP and DOLP images, as discussed above). In some additional embodiments of the present disclosure, the feature extractor 800 extracts other non-polarization feature maps or non-polarization images, such as intensity maps for different colors of light (e.g., red, green, and blue light) and transformations of the intensity maps (e.g., applying image processing filters to the intensity maps). In some embodiments of the present disclosure the feature extractor 800 may be configured to extract one or more features that are automatically learned (e.g., features that are not manually specified by a human) through an end-to-end supervised training process based on labeled training data.

Computing Predictions Such as Segmentation Maps Based on Polarization Features Computed from Polarization Raw Frames As noted above, some aspects of embodiments of the present disclosure relate to providing first tensors in polarization representation space such as polarization images or polarization feature maps, such as the DOLP ρ and AOLP ϕ images extracted by the feature extractor 800, to a predictor such as a semantic segmentation algorithm to perform multi-modal fusion of the polarization images to generate learned features (or second tensors) and to compute predictions such as segmentation maps based on the learned features or second tensors. Specific embodiments relating to semantic segmentation or instance segmentation will be described in more detail below.

Generally, there are many approaches to semantic segmentation, including deep instance techniques. The various the deep instance techniques bay be classified as semantic segmentation-based techniques (such as those described in: Min Bai and Raquel Urtasun. Deep watershed transform for instance segmentation. In *Proceedings of the IEEE Conference on Computer Vision and Pattern Recognition*, pages 5221-5229, 2017; Alexander Kirillov, Evgeny Levinkov, Bjoern Andres, Bogdan Savchynskyy, and Carsten Rother. Instancecut: from edges to instances with multicut. In *Proceedings of the IEEE Conference on Computer Vision and Pattern Recognition*, pages 5008-5017, 2017; and Anurag Arnab and Philip H S Torr. Pixelwise instance segmentation with a dynamically instantiated network. In *Proceedings of the IEEE Conference on Computer Vision and Pattern Recognition*, pages 441-450, 2017.), proposal-based techniques (such as those described in: Kaiming He, Georgia Gkioxari, Piotr Doll'ar, and Ross Girshick. Mask r-cnn. In *Proceedings of the IEEE International Conference on Computer Vision*, pages 2961-2969, 2017.) and recurrent neural network (RNN) based techniques (such as those described in: Bernardino Romera-Paredes and Philip Hilaire Sean Torr. Recurrent instance segmentation. In *European Conference on Computer Vision*, pages 312-329. Springer, 2016 and Mengye Ren and Richard S Zemel. End-to-end instance segmentation with recurrent attention. In *Proceedings of the IEEE Conference on Computer Vision and Pattern Recognition*, pages 6656-6664, 2017.). Embodiments of the present disclosure may be applied to any of these semantic segmentation techniques.

While some comparative approaches supply concatenated polarization raw frames (e.g., images $I_0$, $I_{45}$, $I_{90}$, and $I_{135}$ as described above) directly into a deep network without extracting first tensors such as polarization images or polarization feature maps therefrom, models trained directly on these polarization raw frames as inputs generally struggle to learn the physical priors, which leads to poor performance, such as failing to detect instances of transparent objects or other optically challenging objects. Accordingly, aspects of embodiments of the present disclosure relate to the use of polarization images or polarization feature maps (in some embodiments in combination with other feature maps such as intensity feature maps) to perform instance segmentation on images of transparent objects in a scene.

One embodiment of the present disclosure using deep instance segmentation is based on a modification of a Mask Region-based Convolutional Neural Network (Mask R-CNN) architecture to form a Polarized Mask R-CNN architecture. Mask R-CNN works by taking an input image x, which is an H×W×3 tensor of image intensity values (e.g., height by width by color intensity in red, green, and blue channels), and running it through a backbone network: C=B(x). The backbone network B(x) is responsible for extracting useful learned features from the input image and can be any standard CNN architecture such as AlexNet (see, e.g., Krizhevsky, Alex, Ilya Sutskever, and Geoffrey E. Hinton. "ImageNet classification with deep convolutional neural networks." *Advances in neural information processing systems*. 2012.), VGG (see, e.g., Simonyan, Karen, and Andrew Zisserman. "Very deep convolutional networks for large-scale image recognition." *arXiv preprint arXiv:1409.1556* (2014).), ResNet-101 (see, e.g., Kaiming He, Xiangyu Zhang, Shaoqing Ren, and Jian Sun. Deep residual learning for image recognition. In *Proceedings of the IEEE Conference on Computer Vision and Pattern Recognition*, pages 770-778, 2016.), MobileNet (see, e.g., Howard, Andrew G., et al. "Mobilenets: Efficient convolutional neural networks for mobile vision applications." *arXiv preprint arXiv:1704.04861* (2017).), MobileNetV2 (see, e.g., Sandler, Mark, et al. "MobileNetV2: Inverted residuals and linear bottlenecks." *Proceedings of the IEEE Conference on Computer Vision and Pattern Recognition*. 2018.), and MobileNetV3 (see, e.g., Howard, Andrew, et al. "Searching for MobileNetV3." *Proceedings of the IEEE International Conference on Computer Vision.* 2019.)

The backbone network B(x) outputs a set of tensors, e.g., C={$C_1, C_2, C_3, C_4, C_5$}, where each tensor $C_L$ represents a different resolution feature map. These feature maps are then combined in a feature pyramid network (FPN) (see, e.g., Tsung-Yi Lin, Piotr Doll'ar, Ross Girshick, Kaiming He, Bharath Hariharan, and Serge Belongie. Feature pyramid networks for object detection. In *Proceedings of the IEEE Conference on Computer Vision and Pattern Recognition*, pages 2117-2125, 2017.), processed with a region proposal network (RPN) (see, e.g., Shaoqing Ren, Kaiming He, Ross Girshick, and Jian Sun. Faster r-cnn: Towards real-time object detection with region proposal networks. In *Advances in Neural Information Processing Systems*, pages 91-99, 2015.), and finally passed through an output subnetwork (see, e.g., Ren et al. and He et al., above) to produce classes, bounding boxes, and pixel-wise segmentations. These are merged with non-maximum suppression for instance segmentation.

Aspects of embodiments of the present invention relate to a framework for leveraging the additional information contained in polarized images using deep learning, where this additional information is not present in input images captured by comparative cameras (e.g., information not captured standard color or monochrome cameras without the use of polarizers or polarizing filters). Neural network architectures constructed in accordance with frameworks of embodiments of the present disclosure will be referred to herein as Polarized Convolutional Neural Networks (CNNs).

Applying this framework according to some embodiments of the present disclosure involves three changes to a CNN architecture:

(1) Input Image: Applying the physical equations of polarization to create the input polarization images to the CNN, such as by using a feature extractor 800 according to some embodiments of the present disclosure.

(2) Attention-fusion Polar Backbone: Treating the problem as a multi-modal fusion problem by fusing the learned features computed from the polarization images by a trained CNN backbone.

(3) Geometric Data Augmentations: augmenting the training data to represent the physics of polarization.

However, embodiments of the present disclosure are not limited thereto. Instead, any subset of the above three changes and/or changes other than the above three changes may be made to an existing CNN architecture to create a Polarized CNN architecture within embodiments of the present disclosure.

A Polarized CNN according to some embodiments of the present disclosure may be implemented using one or more electronic circuits configured to perform the operations described in more detail below. In the embodiment shown in FIG. 3, a Polarized CNN is used as a component of the predictor 900 for computing a segmentation map 20, as shown in FIG. 3.

Figure 9:
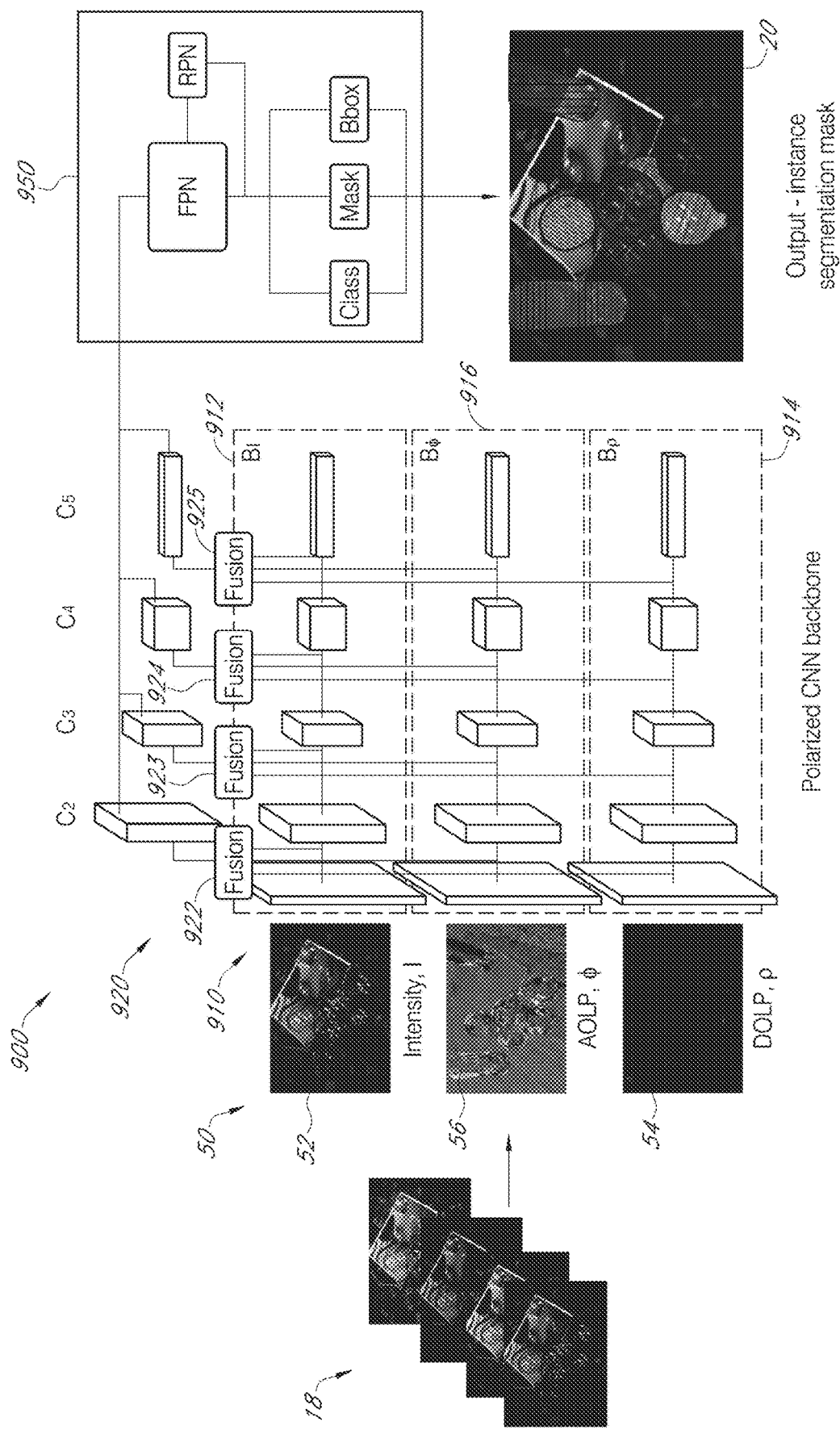
FIG. 9 is a block diagram depicting a Polarized CNN architecture according to one embodiment of the present invention as applied to a Mask-Region-based convolutional neural network (Mask R-CNN) backbone.

FIG. 9 is a block diagram depicting a Polarized CNN architecture according to one embodiment of the present invention as applied to a Mask-Region-based convolutional neural network (Mask R-CNN) backbone, where second tensors C (or output tensors such as learned feature maps) are used to compute an output prediction such as segmentation mask 20.

While some embodiments of the present disclosure relate to a semantic segmentation or instance segmentation using a Polarized CNN architecture as applied to a Mask R-CNN backbone, embodiments of the present disclosure are not limited thereto, and other backbones such as AlexNet, VGG, MobileNet, MobileNetV2, MobileNetV3, and the like may be modified in a similar manner.

In the embodiment shown in FIG. 9, derived feature maps 50 (e.g., including input polarization images such as AOLP $\phi$ and DOLP $\rho$ images) are supplied as inputs to a Polarized CNN backbone 910. In the embodiment shown in FIG. 9, the input feature maps 50 include three input images: the intensity image (I) 52, the AOLP ($\phi$) 56, the DOLP ($\rho$) 54 from equation (1) as the input for detecting a transparent object and/or other optically challenging object. These images are computed from polarization raw frames 18 (e.g., images $I_0, I_{45}, I_{90}$, and $I_{135}$ as described above), normalized to be in a range (e.g., 8-bit values in the range [0-255]) and transformed into three-channel gray scale images to allow for easy transfer learning based on networks pre-trained on the MSCoCo dataset (see, e.g., Tsung-Yi Lin, Michael Maire, Serge Belongie, James Hays, Pietro Perona, Deva Ramanan, Piotr Doll'ar, and C Lawrence Zitnick. Microsoft coco: Common objects in context. In European Conference on Computer Vision, pages 740-755. Springer, 2014.).

In the embodiment shown in FIG. 9, each of the input derived feature maps 50 is supplied to a separate backbone: intensity $B_I(I)$ 912, AOLP backbone $B_\phi(\phi)$ 914, and DOLP backbone $B_\rho(\rho)$ 916. The CNN backbones 912, 914, and 916 compute tensors for each mode, or "mode tensors" (e.g., feature maps computed based on parameters learned during training or transfer learning of the CNN backbone, discussed in more detail below) $C_{i,I}, C_{i,\rho}, C_{i,\phi}$ at different scales or resolutions i. While FIG. 9 illustrates an embodiment with five different scales i, embodiments of the present disclosure are not limited thereto and may also be applied to CNN backbones with different numbers of scales.

Some aspects of embodiments of the present disclosure relate to a spatially-aware attention-fusion mechanism to perform multi-modal fusion (e.g., fusion of the feature maps computed from each of the different modes or different types of input feature maps, such as the intensity feature map I, the AOLP feature map $\phi$, and the DOLP feature map $\rho$).

For example, in the embodiment shown in FIG. 9, the mode tensors $C_{i,I}, C_{i,\rho}, C_{i,\phi}$ (tensors for each mode) computed from corresponding backbones $B_I, B_\rho, B_\phi$ at each scale i are fused using fusion layers 922, 923, 924, 925 (collectively, fusion layers 920) for corresponding scales. For example, fusion layer 922 is configured to fuse mode tensors $C_{2,I}, C_{2,\rho}, C_{2,\phi}$ computed at scale i=2 to compute a fused tensor $C_2$. Likewise, fusion layer 923 is configured to fuse mode tensors $C_{3,I}, C_{3,\rho}, C_{3,\phi}$ computed at scale i=3 to compute a fused tensor $C_3$, and similar computations may be performed by fusion layers 924 and 925 to compute fused feature maps $C_4$ and $C_5$, respectively, based on respective mode tensors for their scales. The fused tensors $C_i$ (e.g., $C_2$, $C_3$, $C_4$, $C_5$), or second tensors, such as fused feature maps, computed by the fusion layers 920 are then supplied as input to a prediction module 950, which is configured to compute a prediction from the fused tensors, where the prediction may be an output such as a segmentation map 20, a classification, a textual description, or the like.

Figure 10:
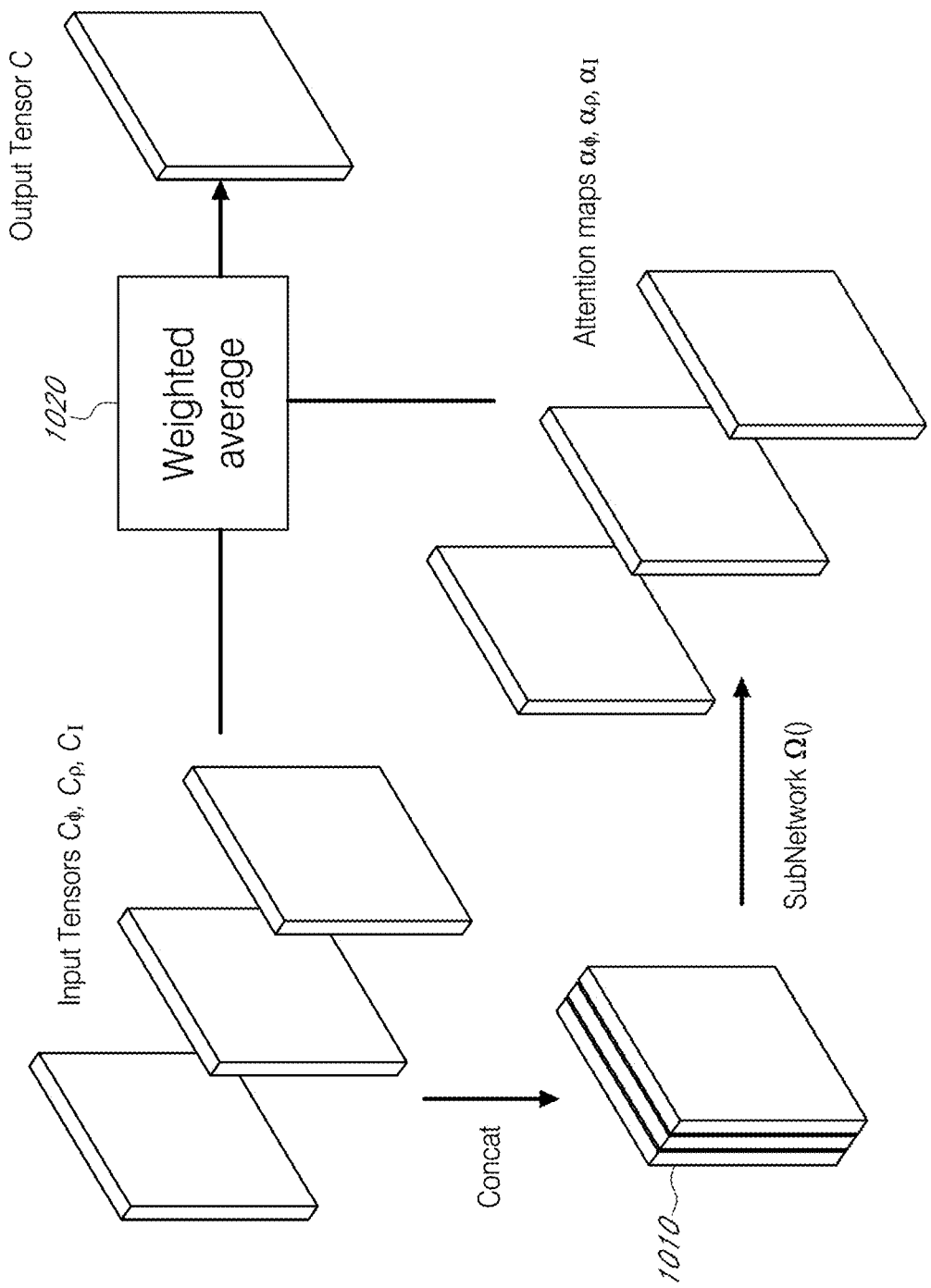
FIG. 10 is a block diagram of an attention module that may be used with a polarized CNN according to one embodiment of the present invention.

FIG. 10 is a block diagram of an i-th fusion layer among the fusion layers 920 that may be used with a Polarized CNN according to one embodiment of the present invention. As shown in FIG. 10, in some embodiments of the present disclosure, a fusion layer (e.g., each of the fusion layer 920) is implemented using an attention module, in which the predictor 900 concatenates the supplied input tensors or input feature maps $C_{i,I}$, $C_{i,\rho}$, $C_{i,\phi}$ computed by the CNN backbones for the i-th scale and to generate concatenated tensor 1010, where the concatenated tensor 1010 is processed through a set of trained convolutional layers or attention subnetwork $\Omega_i$ for the i-thscale. The attention subnetwork $\Omega_i$ outputs a 3-channel image with the same height and width as the input tensors, and, in some embodiments, a softmax function is applied to each pixel of the 3-channel image to compute pixel-wise attention weights $\alpha$ for the i-th scale:

$$[\alpha_{i,\phi}, \alpha_{i,\rho}, \alpha_{i,I}] = \text{softmax}(\Omega_i([C_{i,\phi}, C_{i,\rho}, C_{i,I}])) \tag{11}$$

These attention weights are used to perform a weighted average 1020 per channel:

$$C_i = \alpha_{i,\phi} C_{i,\phi} + \alpha_{i,\rho} C_{i,\rho} + \alpha_{i,I} C_{i,I} \tag{12}$$

Accordingly, using an attention module allows a Polarized CNN according to some embodiments of the present disclosure to weight the different inputs at the scale i (e.g., the intensity I tensor or learned feature map $C_{i,I}$, the DOLP tensor or learned feature map $C_{i,\rho}$, and the AOLP tensor or learned feature map $C_{i,\phi}$ at scale i) based on how relevant they are to a given portion of the scene, where the relevance is determined by the trained attention subnetwork $\Omega_i$ in accordance with the labeled training data used to train the Polarized CNN backbone.

Figure 11:
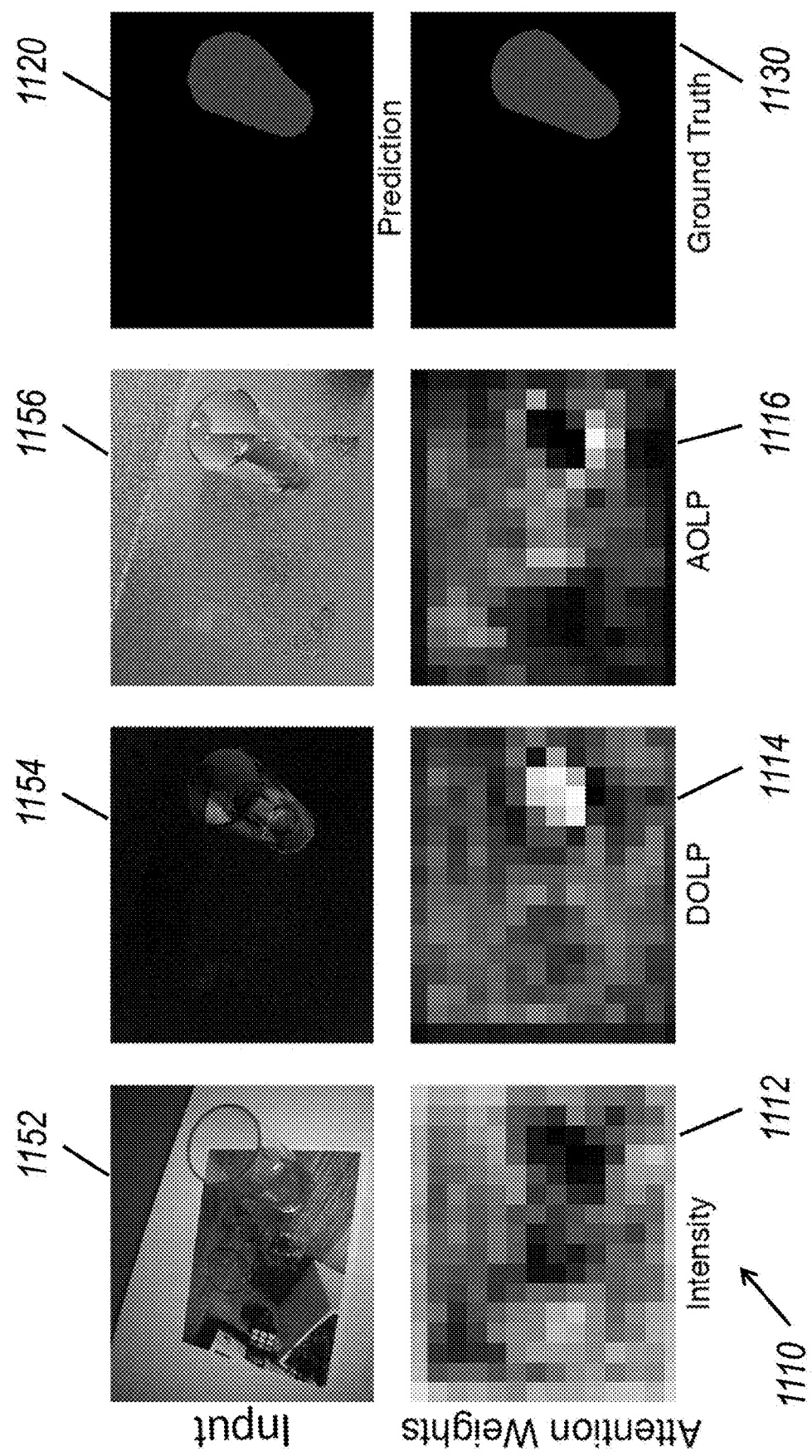
FIG. 11 depicts examples of attention weights computed by an attention module according to one embodiment of the present invention for different mode tensors (in first representation spaces) extracted from polarization raw frames captured by a polarization camera.

FIG. 11 depicts examples of attention weights computed by an attention module according to one embodiment of the present invention for different mode tensors (in different first representation spaces) extracted from polarization raw frames captured by a polarization camera. As shown in FIG. 11 (see, e.g., intensity image 1152), the scene imaged by the polarization camera includes a transparent glass placed on top of a print-out photograph, where the printed photograph depicts a transparent drinking glass (a print-out spoof of a drinking glass) and some background clutter.

As seen in FIG. 11, the learned attention weights 1110 are brightest on the DOLP 1114 and AOLP 1116 in the region around the real drinking glass and avoid the ambiguous print-out spoof in the intensity image 1152. Accordingly, the prediction module 950 can compute, for example, a segmentation mask 1120 that closely matches the ground truth 1130 (e.g., the prediction 1120 shows a shape that closely matches the shape of the transparent object in the scene).

In the embodiment shown in FIG. 9, the prediction module 950 is substantially similar to that used in a Mask R-CNN architecture and computes a segmentation map by combining the fused feature maps C using a feature pyramid network (FPN) and a region proposal network (RPN) as inputs to an output subnetwork for computing a Class, a Mask, and a bounding box (Bbox) for each instance of objects detected in the input images. the computed class, mask, and bounding boxes are then merged with non-maximum suppression to compute the instance segmentation map (or instance segmentation mask) 20.

As noted above, a Polarization CNN architecture can be trained using transfer learning based on an existing deep neural network that was trained using, for example, the MSCoCo dataset and a neural network training algorithm, such as backpropagation and gradient descent. In more detail, the Polarization CNN architecture is further trained based on additional training data representative of the inputs (e.g., using training polarization raw frames to compute training derived feature maps 50 and ground truth labels associated with the training derived feature maps) to the Polarization CNN as extracted by the feature extractor 800 from the polarization raw frames 18. These additional training data may include, for example, polarization raw frames captured, by a polarization camera, of a variety of scenes containing transparent objects or other optically challenging objects in a variety of different environments, along with ground truth segmentation maps (e.g., manually generated segmentation maps) labeling the pixels with the instance and class of the objects depicted in the images captured by the polarization camera.

In the case of small training datasets, affine transformations provide a technique for augmenting training data (e.g., generating additional training data from existing training data) to achieve good generalization performance. However, naively applying affine transformations to some of the source training derived feature maps such as the AOLP $\phi$ image does not provide significant improvements to the performance of the trained neural network and, in some instances, hurts performance. This is because the AOLP is an angle in the range of 0° to 360° (or 0 to $2\pi$) that represents the direction of the electromagnetic wave with respect to the camera coordinate frame. If a rotation operator is applied to the source training image (or source training derived feature map), then this is equivalent to rotating the camera around its Z-axis (e.g., along the optical axis of the lens 12). This rotation will, in turn, change the orientation of the X-Y plane of the camera, and thus will change the relative direction of the electromagnetic wave (e.g., the angle of linear polarization). To account for this change, when augmenting the data by performing rotational affine transformations by an angle of rotation, the pixel values of the AOLP are rotated in the opposite direction (or counter-rotated or a counter-rotation is applied to the generated additional data) by the same angle. This same principle is also applied to other affine transformations of the training feature maps or training first tensors, where the particular transformations applied to the training feature maps or training first tensors may differ in accordance with the underlying physics of what the training feature maps represent. For example, while a DOLP image may be unaffected by a rotation transformation, a translation transformation would require corresponding changes to the DOLP due to the underlying physical behavior of the interactions of light with transparent objects or other optically challenging objects (e.g., translucent objects, non-Lambertian objects, multipath inducing objects, and non-reflective objects).

In addition, while some embodiments of the present disclosure relate to the use of CNN and deep semantic segmentation, embodiments of the present disclosure are not limited there to. In some embodiments of the present disclosure the derived feature maps 50 are supplied (in some embodiments with other feature maps) as inputs to other types of classification algorithms (e.g., classifying an image without localizing the detected objects), other types of semantic segmentation algorithms, or image description algorithms trained to generate natural language descriptions of scenes. Examples of such algorithms include support vector machines (SVM), a Markov random field, a probabilistic graphical model, etc. In some embodiments of the present disclosure, the derived feature maps are supplied as input to classical machine vision algorithms such as feature detectors (e.g., scale-invariant feature transform (SIFT), speeded up robust features (SURF), gradient location and orientation histogram (GLOH), histogram of oriented gradients (HOG), basis coefficients, Haar wavelet coefficients, etc.) to output detected classical computer vision features of detected transparent objects and/or other optically challenging objects in a scene.

FIGS. 12A, 12B, 12C, and 12D depict segmentation maps computed by a comparative image segmentation system, segmentation maps computed by a polarized convolutional neural network according to one embodiment of the present disclosure, and ground truth segmentation maps (e.g., manually-generated segmentation maps). FIGS. 12A, 12B, 12C, and 12D depict examples of experiments run on four different test sets to compare the performance of a trained Polarized Mask R-CNN model according to one embodiment of the present disclosure against a comparative Mask R-CNN model (referred to herein as an "Intensity" Mask R-CNN model to indicate that it operates on intensity images and not polarized images).

The Polarized Mask R-CNN model used to perform the experiments was trained on a training set containing 1,000 images with over 20,000 instances of transparent objects in fifteen different environments from six possible classes of transparent objects: plastic cups, plastic trays, glasses, ornaments, and other. Data augmentation techniques, such as those described above with regard to affine transformations of the input images and adjustment of the AOLP based on the rotation of the images are applied to the training set before training.

The four test sets include:

(a) A Clutter test set contains 200 images of cluttered transparent objects in environments similar to the training set with no print-outs.

(b) A Novel Environments (Env) test set contains 50 images taken of ~6 objects per image with environments not available in the training set. The backgrounds contain harsh lighting, textured cloths, shiny metals, and more.

(c) A Print-Out Spoofs (POS) test set contains 50 images, each containing a 1 to 6 printed objects and 1 or 2 real objects.

(d) A Robotic Bin Picking (RBP) test set contains 300 images taken from a live demo of our robotic arm picking up ornaments (e.g., decorative glass ornaments, suitable for hanging on a tree). This set is used to test the instance segmentation performance in a real-world application.

For each data set, two metrics were used to measure the accuracy: mean average precision (mAP) in range of Intersection over Unions (IoUs) 0.5-0.7 ($mAP_{0.5:07}$), and mean average precision in the range of IoUs 0.75-0.9 ($mAP_{0.75:0.9}$). These two metrics measure coarse segmentation and fine-grained segmentation respectively. To further test generalization, all models were also tested object detection as well using the Faster R-CNN component of Mask R-CNN.

Figure 12A:
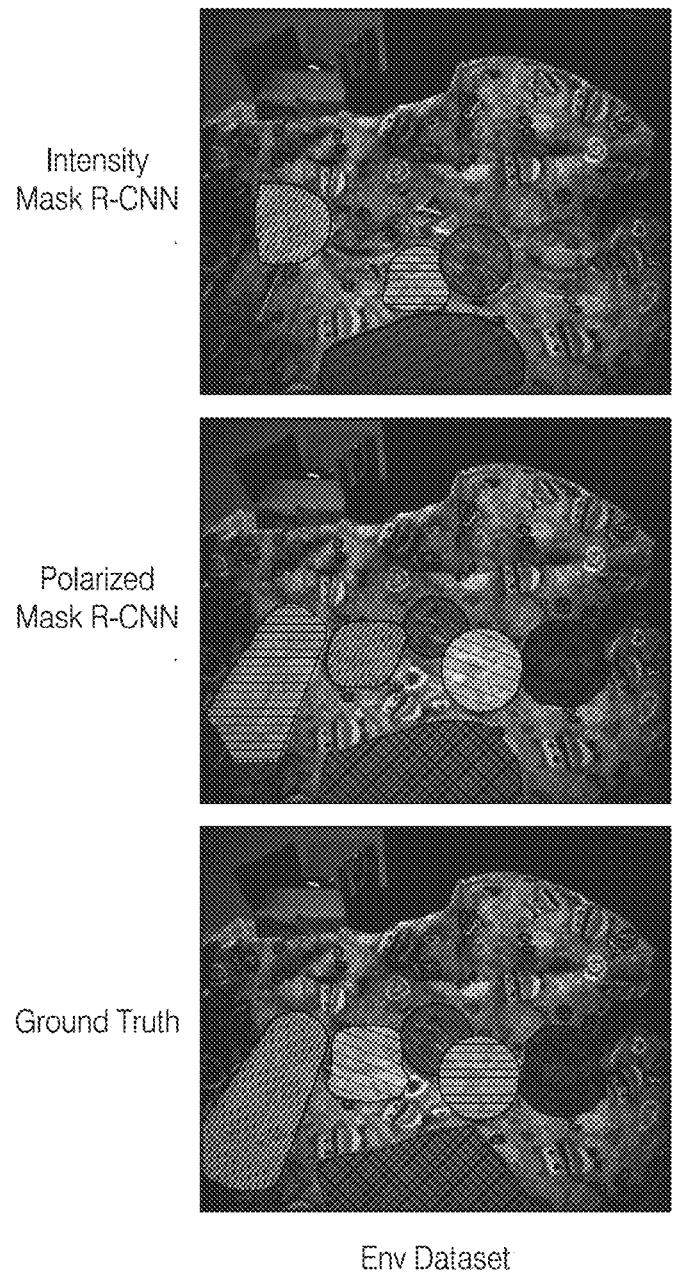
FIGS. 12A, 12B, 12C, and 12D depict segmentation maps computed by a comparative image segmentation system, segmentation maps computed by a polarized convolutional neural network according to one embodiment of the present disclosure, and ground truth segmentation maps (e.g., manually-generated segmentation maps).

The Polarized Mask R-CNN according to embodiments of the present disclosure and the Intensity Mask R-CNN were tested on the four test sets discussed above. The average improvement is 14.3% mAP in coarse segmentation and 17.2% mAP in fine-grained segmentation. The performance improvement in the Clutter problem is more visible when doing fine-grained segmentation where the gap in performance goes from ~1.1% mAP to 4.5% mAP. Therefore, the polarization data appears to provide useful edge information allowing the model to more accurately segment objects. As seen in FIG. 12A, polarization helps accurately segment clutter where it is ambiguous in the intensity image. As a result, in the example from the Clutter test set shown in FIG. 12A, the Polarized Mask R-CNN according to one embodiment of the present disclosure correctly detects all six instances of transparent objects, matching the ground truth, whereas the comparative Intensity Mask R-CNN identifies only four of the six instances of transparent objects.

Figure 12B:
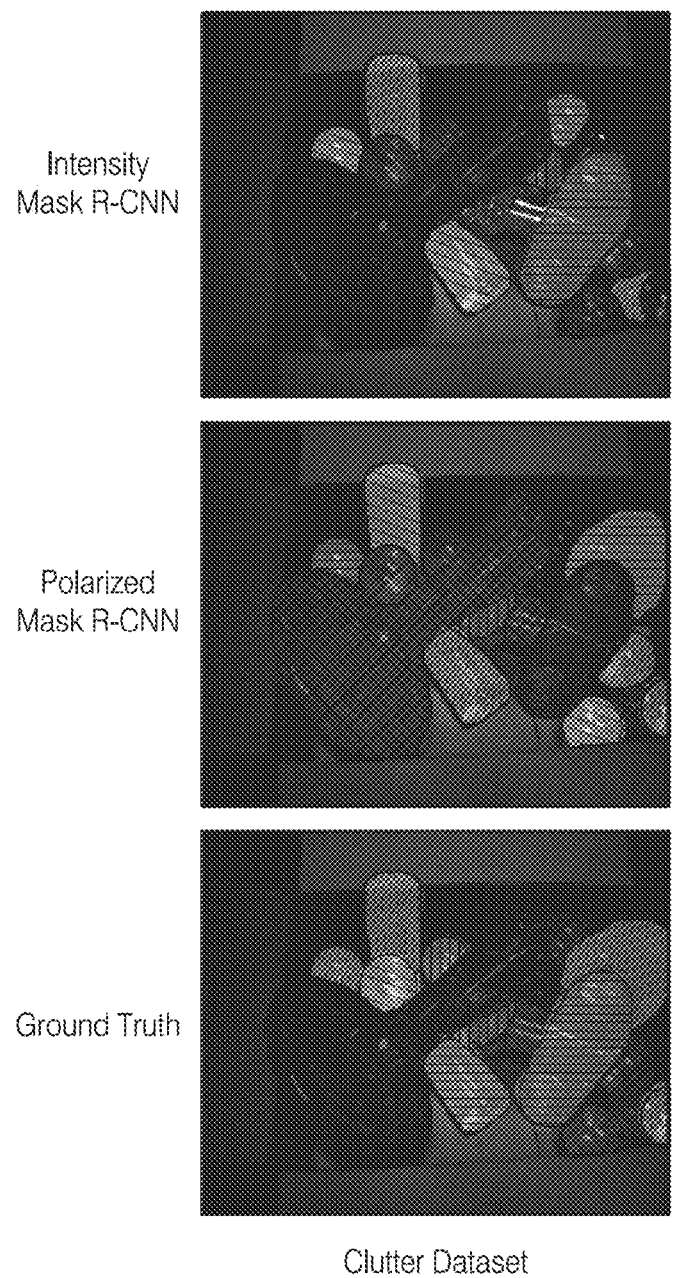

For generalization to new environments there are much larger gains for both fine-grained and coarse segmentation, and therefore it appears that the intrinsic texture of a transparent object is more visible to the CNN in the polarized images. As shown in FIG. 12B, the Intensity Mask R-CNN completely fails to adapt to the novel environment while the Polarized Mask R-CNN model succeeds. While the Polarized Mask R-CNN is able to correctly detect all of the instances of trans parent objects, the Instance Mask R-CNN fails to detect some of the instances (see, e.g., the instances in the top right corner of the box).

Figure 12C:
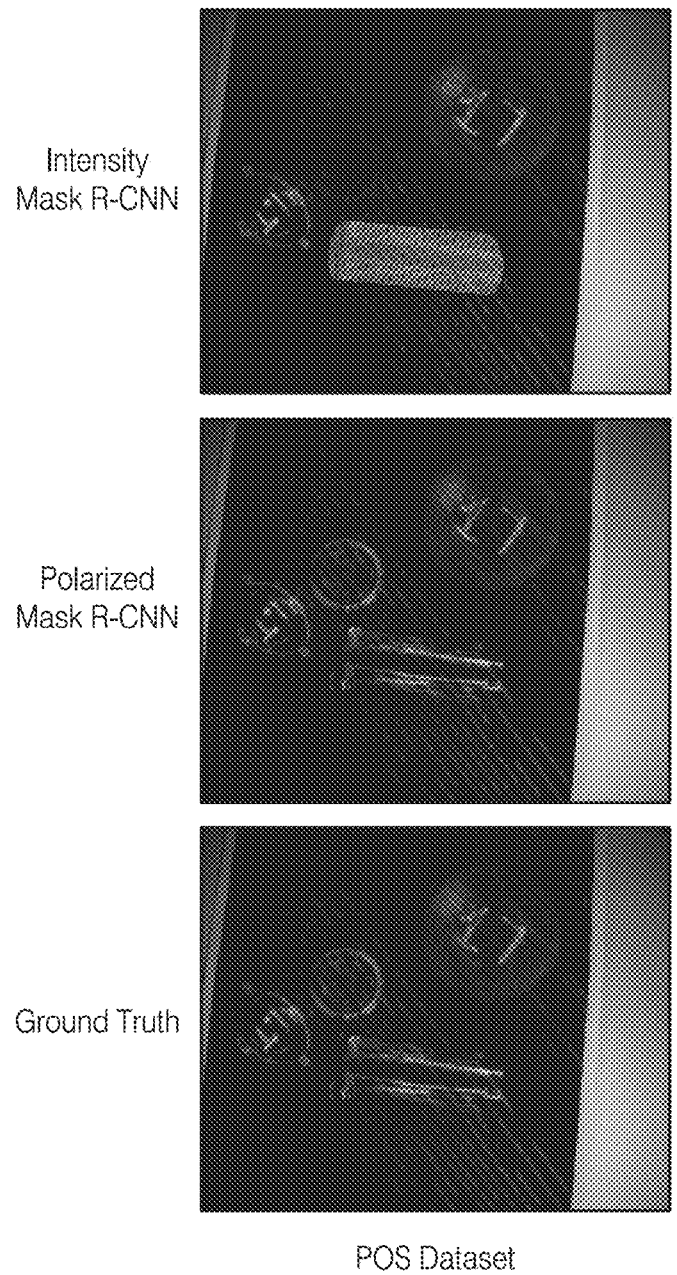

Embodiments of the present disclosure also show a similarly large improvement in robustness against print-out spoofs, achieving almost 90% mAP. As such, embodiments of the present disclosure provide a monocular solution that is robust to perspective projection issues such as print-out spoofs. As shown in FIG. 12C, the Intensity Mask R-CNN is fooled by the printed paper spoofs. In the example shown in FIG. 12C, one real transparent ball is placed on printout depicting three spoof transparent objects. The Intensity Mask R-CNN incorrectly identifies two of the print-out spoofs as instances. On the other hand, the Polarized Mask R-CNN is robust, and detects only the real transparent ball as an instance.

Figure 12D:

All of these results help explain the dramatic improvement in performance shown for an uncontrolled and cluttered environment like Robotic Bin Picking (RBP). As shown in FIG. 12D, in the case of robotic picking of ornaments in low light conditions, the Intensity Mask R-CNN model is only able to detect five of the eleven instances of transparent objects. On the other hand, the Polarized R-CNN model is able to adapt to this environment with poor lighting and correctly identifies all eleven instances.

In more detail, and as an example of a potential application in industrial environments, a computer vision system was configured to control a robotic arm to perform bin picking by supplying a segmentation mask to the controller of the robotic arm. Bin picking of transparent and translucent (non-Lambertian) objects is a hard and open problem in robotics. To show the benefit of high quality, robust segmentation, the performance of a comparative, Intensity Mask R-CNN in providing segmentation maps for controlling the robotic arm to bin pick different sized cluttered transparent ornaments is compared with the performance of a Polarized Mask R-CNN according to one embodiment of the present disclosure.

A bin picking solution includes three components: a segmentation component to isolate each object; a depth estimation component; and a pose estimation component. To understand the effect of segmentation, a simple depth estimation and pose where the robot arm moves to the center of the segmentation and stops when it hits a surface. This works in this example because the objects are perfect spheres. A slightly inaccurate segmentation can cause an incorrect estimate and therefore a false pick. This application enables a comparison between the Polarized Mask R-CNN and Intensity Mask R-CNN. The system was tested in five environments outside the training set (e.g., under conditions that were different from the environments under which the training images were acquired). For each environment, fifteen balls were stacked, and the number of correct/incorrect (missed) picks the robot arm made to pick up all 15 balls (using a suction cup gripper) was counted, capped at 15 incorrect picks. The Intensity Mask R-CNN based model was unable to empty the bin regularly because the robotic arm consistently missed certain picks due to poor segmentation quality. On the other hand, the Polarized Mask R-CNN model according to one embodiment of the present disclosure, picked all 90 balls successfully, with approximately 1 incorrect pick for every 6 correct picks. These results validate the effect of an improvement of ~20 mAP.

As noted above, embodiments of the present disclosure may be used as components of a computer vision or machine vision system that is capable of detecting both transparent objects and opaque objects.

In some embodiments of the present disclosure, a same predictor or statistical model 900 is trained to detect both transparent objects and opaque objects (or to generate second tensors C in second representation space) based on training data containing labeled examples of both transparent objects and opaque objects. For example, in some such embodiments, a Polarized CNN architecture is used, such as the Polarized Mask R-CNN architecture shown in FIG. 9. In some embodiments, the Polarized Mask R-CNN architecture shown in FIG. 9 is further modified by adding one or more additional CNN backbones that compute one or more additional mode tensors. The additional CNN backbones may be trained based on additional first tensors. In some embodiments these additional first tensors include image maps computed based on color intensity images (e.g., intensity of light in different wavelengths, such as a red intensity image or color channel, a green intensity image or color channel, and a blue intensity image or color channel). In some embodiments, these additional first tensors include image maps computed based on combinations of color intensity images. In some embodiments, the fusion modules 920 fuse all of the mode tensors at each scale from each of the CNN backbones (e.g., including the additional CNN backbones).

In some embodiments of the present disclosure, the predictor 900 includes one or more separate statistical models for detecting opaque objects as opposed to transparent objects. For example, an ensemble of predictors (e.g., a first predictor trained to compute a first segmentation mask for transparent objects and a second predictor trained to compute a second segmentation mask for opaque objects) may compute multiple predictions, where the separate predictions are merged (e.g., the first segmentation mask is merged with the second segmentation mask based, for example, on confidence scores associated with each pixel of the segmentation mask).

As noted in the background, above, enabling machine vision or computer vision systems to detect transparent objects robustly has applications in a variety of circumstances, including manufacturing, life sciences, self-driving vehicles, and Accordingly, aspects of embodiments of the present disclosure relate to systems and methods for detecting instances of transparent objects using computer vision by using features extracted from the polarization domain. Transparent objects have more prominent textures in the polarization domain than in the intensity domain. This texture in the polarization texture can exploited with feature extractors and Polarized CNN models in accordance with embodiments of the present disclosure. Examples of the improvement in the performance of transparent object detection by embodiments of the present disclosure are demonstrated through comparisons against instance segmentation using Mask R-CNN (e.g., comparisons against Mask R-CNN using intensity images without using polarization data). Therefore, embodiments of the present disclosure While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A computer-implemented method for computing a prediction on images of a scene, the method comprising:
   receiving one or more polarization raw frames of a scene, the polarization raw frames being captured with a polarizing filter at a different linear polarization angle;
   extracting one or more first tensors in one or more polarization representation spaces from the polarization raw frames; and
   computing a prediction regarding one or more optically challenging objects in the scene based on the one or more first tensors in the one or more polarization representation spaces,
   wherein the one or more first tensors in the one or more polarization representation spaces comprise:
   a degree of linear polarization (DOLP) image in a DOLP representation space; and
   an angle of linear polarization (AOLP) image in an AOLP representation space, and
   wherein the computing the prediction comprises supplying the one or more first tensors in the one or more polarization representation spaces, including the AOLP image in the AOLP representation space, to a statistical model.

2. The computer-implemented method of claim 1, wherein the one or more first tensors further comprise one or more non-polarization tensors in one or more non-polarization representation spaces, and
   wherein the one or more non-polarization tensors comprise one or more intensity images in intensity representation space.

3. The computer-implemented method of claim 2, wherein the one or more intensity images comprise:
   a first color intensity image;
   a second color intensity image; and
   a third color intensity image.

4. The computer-implemented method of claim 1, wherein the prediction comprises a segmentation mask.

5. The computer-implemented method of claim 1, wherein the computing the prediction comprises supplying the one or more first tensors to one or more corresponding convolutional neural network (CNN) backbones, and
   wherein each of the one or more CNN backbones is configured to compute a plurality of mode tensors at a plurality of different scales.

6. The computer-implemented method of claim 5, wherein the computing the prediction further comprises:
   fusing the mode tensors computed at a same scale by the one or more CNN backbones.

7. The computer-implemented method of claim 6, wherein the fusing the mode tensors at the same scale comprises:
   concatenating the mode tensors at the same scale;
   supplying the mode tensors to an attention subnetwork to compute one or more attention maps; and
   weighting the mode tensors based on the one or more attention maps to compute a fused tensor for the scale.

8. The computer-implemented method of claim 7, wherein the computing the prediction further comprises supplying the fused tensors computed at each scale to a prediction module configured to compute the segmentation mask.

9. The computer-implemented method of claim 4, wherein the segmentation mask is supplied to a controller of a robot picking arm.

10. The computer-implemented method of claim 1, wherein the prediction comprises a classification of the one or more polarization raw frames based on the one or more optically challenging objects.

11. The computer-implemented method of claim 1, wherein the prediction comprises one or more detected features of the one or more optically challenging objects depicted in the one or more polarization raw frames.

12. The computer-implemented method of claim 1,
wherein the statistical model is trained using training data comprising training first tensors in the one or more polarization representation spaces and labels.

13. The computer-implemented method of claim 12, wherein the training data comprises:
source training first tensors, in the one or more polarization representation spaces, computed from data captured by a polarization camera; and
additional training first tensors generated from the source training first tensors through affine transformations comprising a rotation.

14. The computer-implemented method of claim 13, wherein, when the additional training first tensors comprise an angle of linear polarization (AOLP) image, generating the additional training first tensors comprises:
rotating the additional training first tensors by an angle; and
counter-rotating pixel values of the AOLP image by the angle.

15. A computer vision system comprising:
a polarization camera comprising a polarizing filter; and
a processing system comprising a processor and memory storing instructions that, when executed by the processor, cause the processor to:
receive one or more polarization raw frames of a scene, the polarization raw frames being captured with a polarizing filter at a different linear polarization angle;
extract one or more first tensors in one or more polarization representation spaces from the polarization raw frames; and
compute a prediction regarding one or more optically challenging objects in the scene based on the one or more first tensors in the one or more polarization representation spaces,
wherein the one or more first tensors in the one or more polarization representation spaces comprise:
a degree of linear polarization (DOLP) image in a DOLP representation space; and
an angle of linear polarization (AOLP) image in an AOLP representation space, and
wherein the instructions to compute the prediction comprise instructions that, when executed by the processor, cause the processor to supply the one or more first tensors, including the AOLP image in the AOLP representation space, to a statistical model.

16. The computer vision system of claim 15, wherein the one or more first tensors further comprise one or more non-polarization tensors in one or more non-polarization representation spaces, and
wherein the one or more non-polarization tensors comprise one or more intensity images in intensity representation space.

17. The computer vision system of claim 16, wherein the one or more intensity images comprise:

a first color intensity image;
a second color intensity image; and
a third color intensity image.

18. The computer vision system of claim 15, wherein the prediction comprises a segmentation mask.

19. The computer vision system of claim 18, wherein the memory further stores instructions that, when executed by the processor, cause the processor to compute the prediction by supplying the one or more first tensors to one or more corresponding convolutional neural network (CNN) backbones, and
wherein each of the one or more CNN backbones is configured to compute a plurality of mode tensors at a plurality of different scales.

20. The computer vision system of claim 19, wherein the memory further stores instructions that, when executed by the processor, cause the processor to:
fuse the mode tensors computed at a same scale by the one or more CNN backbones.

21. The computer vision system of claim 18, wherein the segmentation mask is supplied to a controller of a robot picking arm.

22. The computer vision system of claim 15, wherein the prediction comprises a classification of the one or more polarization raw frames based on the one or more optically challenging objects.

23. The computer vision system of claim 15, wherein the prediction comprises one or more detected features of the one or more optically challenging objects depicted in the one or more polarization raw frames.

24. The computer vision system of claim 15,
wherein the statistical model is trained using training data comprising training first tensors in the one or more polarization representation spaces and labels.

25. The computer vision system of claim 24, wherein the training data comprises:
source training first tensors computed from data captured by a polarization camera; and
additional training first tensors generated from the source training first tensors through affine transformations comprising a rotation.

26. The computer vision system of claim 25, wherein, when the additional training first tensors comprise an angle of linear polarization (AOLP) image, generating the additional training first tensors comprises:
rotating the additional training first tensors by an angle; and
counter-rotating pixel values of the AOLP image by the angle.

27. A computer vision system comprising:
a polarization camera comprising a polarizing filter; and
a processing system comprising a processor and memory storing instructions that, when executed by the processor, cause the processor to:
receive one or more polarization raw frames of a scene, the polarization raw frames being captured with a polarizing filter at a different linear polarization angle;
extract one or more first tensors in one or more polarization representation spaces from the polarization raw frames; and
compute a prediction regarding one or more optically challenging objects in the scene based on the one or more first tensors in the one or more polarization representation spaces, wherein the prediction comprises a segmentation mask,
wherein the memory further stores instructions that, when executed by the processor, cause the processor to compute the prediction by supplying the one or more first tensors to one or more corresponding convolutional neural network (CNN) backbones,
wherein each of the one or more CNN backbones is configured to compute a plurality of mode tensors at a plurality of different scales,
wherein the memory further stores instructions that, when executed by the processor, cause the processor to:
 fuse the mode tensors computed at a same scale by the one or more CNN backbones, and
wherein the instructions that cause the processor to fuse the mode tensors at the same scale comprise instructions that, when executed by the processor, cause the processor to:
 concatenate the mode tensors at the same scale;
 supply the mode tensors to an attention subnetwork to compute one or more attention maps; and
 weight the mode tensors based on the one or more attention maps to compute a fused tensor for the scale.

28. The computer vision system of claim 27, wherein the instructions that cause the processor to compute the prediction further comprise instructions that, when executed by the processor, cause the processor to supply the fused tensors computed at each scale to a prediction module configured to compute the segmentation mask.

* * * * *